US011117221B2

United States Patent
Goya et al.

(10) Patent No.: US 11,117,221 B2
(45) Date of Patent: Sep. 14, 2021

(54) LASER MACHINING DEVICE AND LASER MACHINING METHOD

(71) Applicant: MITSUBISHI HEAVY INDUSTRIES, LTD., Tokyo (JP)

(72) Inventors: Saneyuki Goya, Tokyo (JP); Minoru Danno, Tokyo (JP); Toshiya Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 398 days.

(21) Appl. No.: 16/308,891

(22) PCT Filed: Jun. 20, 2017

(86) PCT No.: PCT/JP2017/022694
§ 371 (c)(1),
(2) Date: Feb. 19, 2019

(87) PCT Pub. No.: WO2017/221931
PCT Pub. Date: Dec. 28, 2017

(65) Prior Publication Data
US 2019/0176271 A1    Jun. 13, 2019

(30) Foreign Application Priority Data

Jun. 22, 2016 (JP) .............................. JP2016-123735

(51) Int. Cl.
*B23K 26/38* (2014.01)
*B23K 26/06* (2014.01)
(Continued)

(52) U.S. Cl.
CPC ........ *B23K 26/382* (2015.10); *B23K 26/0608* (2013.01); *B23K 26/0613* (2013.01);
(Continued)

(58) Field of Classification Search
CPC .. B23K 26/389; B23K 26/382; B23K 26/384; B23K 26/0624; B23K 26/0643;
(Continued)

(56) References Cited

U.S. PATENT DOCUMENTS 4,408,831 A * 10/1983 Sakaguchi ........... G02B 6/3512
359/223.1
5,043,553 A     8/1991 Corfe et al.
(Continued)

FOREIGN PATENT DOCUMENTS

EP    2 853 338 A1    4/2015
JP    2-192890 A      7/1990
(Continued)

OTHER PUBLICATIONS

Machine translation of Japan Patent document No. 2003-215,477-A,Mar. 2021 (Year: 2021).*
(Continued)

*Primary Examiner* — Geoffrey S Evans
(74) *Attorney, Agent, or Firm* — Westerman, Hattori, Daniels & Adrian, LLP

(57) ABSTRACT

A laser machining device includes a laser machining head and a control unit. The laser machining head applies laser for machining an object to be machined, and includes a first laser light source for first laser, a second laser light source for second laser having a different pulse width different from the first laser, a condensing optical system provided between the object and the laser light sources to condense at least the lasers on the object, a switch mechanism provided between the condensing optical system and the laser light sources so that the switch mechanism is movable to a position that at least one of the lasers enters the condensing optical system, and an irradiation angle change mechanism provided between the condensing optical system and the switch
(Continued)

mechanism to change an irradiation angle of the first laser. The control unit controls the laser machining head.

10 Claims, 15 Drawing Sheets

(51) Int. Cl.
    *B23K 26/382*     (2014.01)
    *B23K 26/384*     (2014.01)
    *B23K 26/082*     (2014.01)
    *B23K 26/0622*     (2014.01)
    *B23K 26/402*     (2014.01)
    *B23K 101/34*     (2006.01)
    *B23K 103/18*     (2006.01)
    *B23K 101/00*     (2006.01)

(52) U.S. Cl.
    CPC ...... *B23K 26/0624* (2015.10); *B23K 26/0643* (2013.01); *B23K 26/0665* (2013.01); *B23K 26/082* (2015.10); *B23K 26/384* (2015.10); *B23K 26/389* (2015.10); *B23K 26/402* (2013.01); *B23K 2101/001* (2018.08); *B23K 2101/34* (2018.08); *B23K 2103/26* (2018.08)

(58) Field of Classification Search
    CPC .............. B23K 26/082; B23K 26/0613; B23K 26/0608; B23K 26/0665; B32K 26/402
    See application file for complete search history.

(56) References Cited

U.S. PATENT DOCUMENTS

| | | | |
|---|---|---|---|
| 5,216,808 A | 6/1993 | Martus et al. | |
| 2005/0173388 A1* | 8/2005 | Lavers | B23K 26/082 219/121.71 |
| 2005/0230365 A1* | 10/2005 | Lei | B23K 26/40 219/121.71 |
| 2009/0310628 A1 | 12/2009 | Yamazaki | |
| 2010/0147812 A1* | 6/2010 | Beck | B23K 26/0622 219/121.71 |
| 2013/0175243 A1* | 7/2013 | Wang | B23K 26/382 219/121.7 |
| 2016/0193693 A1 | 7/2016 | Goya et al. | |

FOREIGN PATENT DOCUMENTS

| | | | |
|---|---|---|---|
| JP | 9-164493 A | | 6/1997 |
| JP | 2003-205383 A | | 7/2003 |
| JP | 2003215477 A | * | 7/2003 |
| JP | 2008-55478 A | | 3/2008 |
| JP | 2009-523616 A | | 6/2009 |
| JP | 2009-297777 A | | 12/2009 |
| JP | 2015-61731 A | | 4/2015 |

OTHER PUBLICATIONS

Written Opinion of the International Searching Authority dated Sep. 12, 2017, issued in counterpart International Application No. PCT/JP2017/022694 (16 pages total, including Japanese original and English translation).
International Search Report dated Sep. 12, 2017, issued in counterpart International Application No. PCT/JP2017/022694 (2 pages).
Office Action dated Apr. 14, 2020, issued in counterpart JP Application No. 2016-123735, with English translation (10 pages).

\* cited by examiner

LASER MACHINING DEVICE AND LASER MACHINING METHOD

FIELD

The present invention relates to a laser machining device and a laser machining method.

BACKGROUND

Conventionally, for example, Patent Literature 1 discloses a technology for opening a film cooling hole in a blade of a gas turbine or the like by machining a thermal barrier coating (TBC) provided on the surface of the blade with pulsed ultraviolet laser and machining base metal with YAG laser.

Patent Literature 2 discloses a technology for forming a cooling hole in an object to be machined, which is a composite material in which a protective layer (TBC) is formed on the surface of a metal layer, by cutting the protective layer with short-pulsed laser with high precision while further reducing a heat-affected layer generated in the protective layer and by cutting the metal layer with fiber laser at high speed. Patent Literature 2 indicates that a machining device for machining an object to be machined includes a laser machining head for irradiating the object to be machined with laser, and the laser machining head has a switch mechanism for irradiating the object to be machined with fiber laser and short-pulsed laser in a switchable manner.

CITATION LIST

Patent Literature

Patent Literature 1: U.S. Pat. No. 5,216,808
Patent Literature 2: Japanese Patent Application Laid-open No. 2015-061731

SUMMARY

Technical Problems

In recent years, a cooling hole having a complicated shape called "shaped", whose inner cross-section is circular and whose surface opening shape radially increases in diameter, has been applied in order to enhance cooling efficiency. In an object to be machined in which a protective layer (such as ceramics) is formed on the surface of a metal layer, however, it is common practice to machine the protective layer by machining such as drilling and machine the metal layer by electrical discharge machining. Thus, no technology for consistent machining has been established.

Specifically, it is desired to reduce the diameter of a cooling hole and increase the thickness of a protective layer in order to improve cooling efficiency, but after the cooling hole is machined in the metal layer, if a coating of the protective layer is applied and drilling is performed at a recessed part, there is a problem in that it may be difficult to specify a machining position on the protective layer due to the reduced diameter of the cooling hole and the increased thickness of the protective layer. Electrical discharge machining has difficulty in machining a protective layer of TBC as insulating material, and hence consistent machining cannot be applied.

Laser machining, which can machine a protective layer of a metal layer regardless of material, is a machining method effective for consistent machining. However, a machining device and a machining method that achieve high-quality machining and high-speed machining have not been established. A shaped hole is constituted by a shaped portion on a surface part and a circular hole connecting to the shaped portion. For machining the shaped portion with high precision, short-pulsed laser (with a pulse interval of 100 microseconds or less) suited for precision machining is superior. For machining the circular hole portion, pulsed laser (such as fiber laser and YAG laser) on the order of sub-milliseconds or milliseconds is suitable. Thus, high-speed and high-quality machining requires two laser machines, that is, a laser machine for machining a shaped portion and another laser machine for machining a circular hole portion, and hence there is a problem in that the device cost is high and the machining time increases due to changeover, and the laser irradiation position on the object to be machined needs to be changed a plurality of times. The shaped hole may have a configuration in which the angle of a center axis of the circular hole portion and the angle of a wall surface of the shaped portion are shifted, and hence it is desired to machine the circular hole portion and the shaped portion while changing the laser irradiation angle to the object to be machined. For example, when the laser irradiation angle to the object to be machined is changed, the object to be machined or the laser machining head can be moved for machining, but there is a problem in that it takes time to change the angle and the machining time increases, and the laser irradiation position on the object to be machined needs to be changed a plurality of times.

Machining by pulsed laser causes dross as a molten material of an object to be machined. The dross overflows onto the surface until a hole penetrates the object to be machined, and hence the dross is scattered on the surface of the object to be machined and adheres and solidifies as spatter to reduce the quality. In particular, the protective layer of TBC and the metal layer have different coefficients of thermal expansion for input heat, and hence when the spatter of the metal layer adheres and solidifies onto the protective layer of TBC, cracks may easily occur in the protective layer due to heat, which may affect the quality of the protective layer. Work for removing the adhering and solidifying spatter is necessary, thus causing a problem of increased machining time and increased work cost.

The present invention has been made in order to solve the above-mentioned problems, and it is an object thereof to provide a laser machining device and a laser machining method capable of high-quality cutting.

Solution to Problem

To achieve the object described above, a laser machining device according to an aspect of the present invention includes a stage unit including a stage configured to support an object to be machined; and a laser machining unit including a first laser light source configured to output first laser, a second laser light source configured to output second laser having a pulse width different from a pulse width of the first laser, and a laser machining head configured to apply laser for machining the object to be machined. The laser machining head includes a switch mechanism for making switching between a state in which the first laser enters a condensing optical system configured to condense the laser and a state in which the second laser enters the condensing optical system, and an irradiation angle change mechanism for changing an incident position of the laser with respect to the condensing optical system to change an irradiation angle of the laser.

With the laser machining device, the laser to be applied can be switched by the switch mechanism, and hence the laser to be used can be switched depending on the size, thickness, and material of an object to be machined. Consequently, machining by first laser and machining by second laser can be performed by a single laser machining head. Thus, machining can be performed while maintaining the fixed state of the object to be machined, and the off-centering can be prevented from occurring at a machined part. As a result, machining appropriate for the intended use can be performed with high quality and high precision in a short period of time. In addition, with the laser machining device, the irradiation angle change mechanism is used to cause the laser to enter the condensing optical system while being shifted (translated) from the center axis of the condensing optical system and the object to be machined is irradiated with laser light such that the irradiation angle of the laser light is inclined with respect to the center axis and the condensing position is the same. Thus, the irradiation angle of laser to be used can be changed depending on machining for different diameters and shapes. Consequently, machining depending on different diameters and shapes can be performed with high quality and high precision in a short period of time.

Further, in the laser machining device according to an aspect of the present invention, it is preferable that the switch mechanism includes a mirror configured to reflect the laser, and a slide movement mechanism unit configured to slide and move the mirror, and the sliding movement of the mirror by the slide movement mechanism unit makes switching between a state in which one of the first laser and the second laser is reflected by the mirror to enter the condensing optical system and a state in which the other of the first laser and the second laser enters the condensing optical system without going through the mirror.

This laser machining device can switch lasers.

Further, in the laser machining device according to an aspect of the present invention, it is preferable that the switch mechanism includes a mirror configured to reflect the laser, and a rotational movement mechanism unit configured to rotationally move the mirror, and the rotational movement of the mirror by the rotational movement mechanism unit makes switching between a state in which one of the first laser and the second laser is reflected by the mirror to enter the condensing optical system and a state in which the other of the first laser and the second laser enters the condensing optical system without going through the mirror.

With the laser machining device, the switch mechanism is configured such that the mirror is rotationally moved by the rotational movement mechanism unit, and hence the lasers can be switched at high speed and machining can be performed in a shorter period of time as compared with the case where the mirror is slidingly moved. In addition, the switch mechanism is configured such that the mirror is rotationally moved by the rotational movement mechanism unit, and hence the posture of the mirror can be stably supported by the rotation shaft as compared with the case where the mirror is slidingly moved, and precise machining can be performed with high quality.

Further, in the laser machining device according to an aspect of the present invention, it is preferable that the irradiation angle change mechanism includes a mirror configured to reflect the laser, and a slide movement mechanism unit configured to slidingly move the mirror along an axial direction of the laser, and the sliding movement of the mirror by the slide movement mechanism unit changes incident positions of the first laser and the second laser with respect to the condensing optical system.

The laser machining device can change the irradiation angle of laser.

Further, in the laser machining device according to an aspect of the present invention, it is preferable that the irradiation angle change mechanism includes a first mirror configured to reflect the laser, a rotational movement mechanism unit configured to rotationally move the first mirror, and a second mirror that is fixed at a different position from the first mirror in an axial direction of the laser to reflect the laser, and the rotational movement of the first mirror by the rotational movement mechanism unit makes switching between a state in which one of the first laser and the second laser is reflected by the first mirror to enter the condensing optical system and a state in which the other of the first laser and the second laser is reflected by the second mirror to enter the condensing optical system without going through the first mirror.

With this laser machining device, the irradiation angle change mechanism is configured such that the first mirror is rotationally moved by the rotational movement mechanism unit, and hence the incident position of the laser can be changed at higher speed and machining can be performed at high speed as compared with the case where the first mirror is slidingly moved. In addition, the irradiation angle change mechanism is configured such that the first mirror is rotationally moved by the rotational movement mechanism unit, and hence the posture of the first mirror can be stably supported by the rotation shaft as compared with the case where the first mirror is slidingly moved, and precise machining can be performed with high quality.

Further, a laser machining device according to an aspect of the present invention includes a stage unit including a stage configured to support an object to be machined; and a laser machining unit including a first laser light source configured to output first laser, a second laser light source configured to output second laser having a pulse width different from a pulse width of the first laser, and a laser machining head configured to apply laser for machining the object to be machined. The laser machining head includes a switch mechanism for making switching between a state in which the first laser enters a condensing optical system configured to condense the laser and a state in which the second laser enters the condensing optical system. The switch mechanism includes a mirror configured to reflect the laser, and a rotational movement mechanism unit configured to rotationally move the mirror. The rotational movement of the mirror by the rotational movement mechanism unit makes switching between a state in which one of the first laser and the second laser is reflected by the mirror to enter the condensing optical system and a state in which the other of the first laser and the second laser enters the condensing optical system without going through the mirror.

With this laser machining device, the laser to be applied can be switched by the switch mechanism, and hence the laser to be used can be switched depending on the size, thickness, and material of an object to be machined. Consequently, machining by the first laser and machining by the second laser can be performed by a single laser machining head. Thus, machining can be performed while maintaining the fixed state of the object to be machined, and the off-centering can be prevented from occurring at a machined part. As a result, machining appropriate for the intended use can be performed with high quality and high precision in a short period of time. In addition, in the laser machining device, the switch mechanism is configured such that the mirror is rotationally moved by the rotational movement mechanism unit, and hence the lasers can be switched at high speed and machining can be performed in a shorter period of time as compared with the case where the mirror is slidingly moved. In addition, the switch mechanism is configured such that the mirror is rotationally moved by the rotational movement mechanism unit, and hence the posture of the mirror can be stably supported by the rotation shaft as compared with the case where the mirror is slidingly moved, and precise machining can be performed with high quality.

Further, a laser machining device according to an aspect of the present invention includes a stage unit including a stage configured to support an object to be machined; and a laser machining unit including a laser light source configured to output laser, and a laser machining head configured to apply laser for machining the object to be machined. The laser machining head includes an irradiation angle change mechanism configured to change an incident position of the laser with respect to a condensing optical system configured to condense the laser to change an irradiation angle of the laser. The irradiation angle change mechanism includes a mirror configured to reflect the laser, and a slide movement mechanism unit configured to slidingly move the mirror along an axial direction of the laser. The sliding movement of the mirror by the slide movement mechanism unit changes the incident position of the laser with respect to the condensing optical system.

With this laser machining device, the irradiation angle change mechanism is used to cause the laser to enter the condensing optical system while being shifted (translated) from the center axis of the condensing optical system and the object to be machined is irradiated with laser light such that the irradiation angle of the laser light is inclined with respect to the center axis and the condensing position is the same. Thus, the irradiation angle of laser to be used can be changed depending on machining for different diameters and shapes. Consequently, machining depending on different diameters and shapes can be performed with high quality and high precision in a short period of time.

Further, a laser machining device according to an aspect of the present invention, a stage unit including a stage configured to support an object to be machined; and a laser machining unit including a laser light source configured to output laser, and a laser machining head configured to apply laser for machining the object to be machined. The laser machining head includes an irradiation angle change mechanism configured to change an incident position of the laser with respect to a condensing optical system configured to condense the laser to change an irradiation angle of the laser. The irradiation angle change mechanism includes a first mirror configured to reflect the laser, a rotational movement mechanism unit configured to rotationally move the first mirror, and a second mirror that is fixed at a position different from the first mirror in an axial direction of the laser to reflect the laser. The rotational movement of the first mirror by the rotational movement mechanism unit makes switching between a state in which the laser is reflected by the first mirror to enter the condensing optical system and a state in which the laser is reflected by the second mirror to enter the condensing optical system without going through the first mirror.

With this laser machining device, the irradiation angle change mechanism is used to cause the laser to enter the condensing optical system while being shifted (translated) from the center axis of the condensing optical system and the object to be machined is irradiated with laser light such that the irradiation angle of the laser light is inclined with respect to the center axis and the condensing position is the same. Thus, the irradiation angle of laser to be used can be changed depending on machining for different diameters and shapes. Consequently, machining depending on different diameters and shapes can be performed with high quality and high precision in a short period of time. In addition, the irradiation angle change mechanism is configured such that the first mirror is rotationally moved by the rotational movement mechanism unit, and hence the laser incident position can be changed at higher speed and machining can be performed at high speed as compared with the case where the first mirror is slidingly moved. In addition, the irradiation angle change mechanism is configured such that the first mirror is rotationally moved by the rotational movement mechanism unit, and hence the posture of the first mirror can be stably supported by the rotation shaft as compared with the case where the first mirror is slidingly moved, and precise machining can be performed with high quality.

Further, in the laser machining device according to an aspect of the present invention, it is preferable that the laser light source includes a first laser light source configured to output first laser and a second laser light source configured to output second laser having a pulse width different from a pulse width of the first laser, and the irradiation angle change mechanism changes incident positions of the first laser and the second laser with respect to the condensing optical system.

With this laser machining device, the irradiation angle change mechanism changes the incident position of lasers having different pulse widths, and hence the laser to be used can be switched depending on the size, thickness, and material of an object to be machined. Consequently, machining by the first laser and machining by the second laser can be performed by a single laser machining head. Thus, machining can be performed while maintaining the fixed state of the object to be machined, and the off-centering can be prevented from occurring at a machined part. As a result, machining appropriate for the intended use can be performed with high quality and high precision in a short period of time.

Further, in the laser machining device according to an aspect of the present invention, it is preferable that the first laser light source outputs laser having a pulse width of sub-milliseconds or more as the first laser, and the second laser light source outputs short-pulsed laser having a pulse width of 100 microseconds or less as the second laser.

This laser machining device enables the laser having a pulse width of sub-milliseconds or more to perform machining at relatively high speed and the short-pulsed laser to perform machining with relatively high precision. Consequently, by switching the lasers while utilizing the respective advantages or changing the incident position, machining can be performed with high quality and high precision in a short period of time.

Further, in the laser machining device according to an aspect of the present invention, it is preferable that the laser machining head is configured such that a distance for the short-pulsed laser to enter the condensing optical system is shorter than a distance for the laser having a pulse width of sub-milliseconds or more to enter the condensing optical system.

This laser machining device can reduce energy loss of short-pulsed laser for performing machining for which precision is required, and thus can perform machining with high precision.

To achieve the object described above, a laser machining method according to an aspect of the present invention is a laser machining method for machining a through hole in an object to be machined by laser. The laser machining method includes the steps of: cutting an auxiliary through hole having a diameter smaller than a diameter of the through hole in a machining range of the through hole in the object to be machined; and cutting the through hole such that the auxiliary through hole is enlarged.

With this laser machining method, a through hole is formed in an object to be machined in a manner that an auxiliary through hole having a diameter smaller than that of the through hole is famed and then the auxiliary through hole is enlarged. Thus, because the auxiliary through hole is formed first, when the through hole is subsequently machined, dross as a molten material of the object to be machined is discharged through the auxiliary through hole. Consequently, a situation where dross outflows to the surface of the object to be machined and is scattered can be prevented, and the dross can be prevented from adhering and solidifying onto the surface of the object to be machined as spatter to perform cutting with high quality. In addition, the work for removing the spatter is unnecessary because the adhesion of spatter is prevented, and hence the machining time and the work cost can be reduced.

Further, a laser machining method according to an aspect of the present invention is a laser machining method for machining, by laser, a through hole in which a large-diameter portion that is opened to have a large diameter on a surface side and a small-diameter portion having a small diameter on a deep side communicate to each other in an object to be machined having a laminate structure in which a protective layer is formed on a surface of a metal layer. The laser machining method includes the steps of: cutting an auxiliary through hole having a diameter smaller than a diameter of the small-diameter portion in a machining range of the through hole in the object to be machined; and cutting the through hole in a manner to enlarge the auxiliary through hole.

With this laser machining method, a through hole is formed in an object to be machined in a manner that an auxiliary through hole having a diameter smaller than that of the through hole is famed and then the auxiliary through hole is enlarged. The auxiliary through hole has a diameter smaller than the hole diameter of a small-diameter portion having the smallest diameter in the through hole. Thus, because the auxiliary through hole is formed first, when the large-diameter portion or the small-diameter portion is subsequently machined, dross as a molten material of the object to be machined is discharged through the auxiliary through hole. Consequently, a situation where dross outflows to the surface of the object to be machined and is scattered can be prevented, and the dross can be prevented from adhering and solidifying onto the surface of the object to be machined as spatter to perform cutting with high quality. In addition, the work for removing the spatter is unnecessary because the adhesion of spatter is prevented, and hence the machining time and the work cost can be reduced.

Further, in the laser machining method according to an aspect of the present invention, it is preferable that the step of cutting the auxiliary through hole includes applying laser having a pulse width of sub-milliseconds or more for machining, and the step of cutting the through hole includes applying short-pulsed laser having a pulse width of 100 microseconds or less to machine the large-diameter portion and thereafter applying laser having a pulse width of sub-milliseconds or more to machine the small-diameter portion.

This laser machining method enables the laser having a pulse width of sub-milliseconds or more to machine the small-diameter portion at relatively high speed and the short-pulsed laser to machine the large-diameter portion with relatively high precision. Consequently, the advantages of the lasers can be utilized to perform machining with high quality and high precision in a short period of time.

Further, in the laser machining method according to an aspect of the present invention, it is preferable that the step of cutting the auxiliary through hole includes applying short-pulsed laser having a pulse width of 100 microseconds or less and thereafter applying laser having a pulse width of sub-milliseconds or more for machining, and the step of cutting the through hole includes applying short-pulsed laser having a pulse width of 100 microseconds or less to machine the large-diameter portion and thereafter applying laser having a pulse width of sub-milliseconds or more to machine the small-diameter portion.

This laser machining method can minimize the amount of spatter adhering to the surface of an object to be machined, and eliminates the need of work for removing spatter or requires only simple removal work and can thus reduce work cost. Short-pulsed laser with a pulse width of 100 microseconds or less, which has high peak power of several tens of kW or more, can perform high-quality machining capable of suppressing the generation of dross and is effective to minimize the amount of spatter adhesion. It was found from observation of the generation of spatter that spatter is apt to be particularly generated early in laser machining. Thus, in forming the auxiliary through hole, an object to be machined is irradiated with short-pulsed laser having a pulse width of 100 microseconds or less and machined at an early stage where spatter is apt to be generated, and is thereafter irradiated with laser having a pulse width of sub-milliseconds or more. In this manner, the machining time can be reduced while the amount of spatter adhesion is minimized.

Advantageous Effects of Invention

The present invention can perform cutting with high quality.

DESCRIPTION OF EMBODIMENTS

Embodiments of the present invention are described in detail below with reference to the drawings.

The present invention is not limited by the embodiments. Components in the following embodiments include the ones that can be easily replaced by a person skilled in the art and the ones that are substantially the same.

Figure 1:
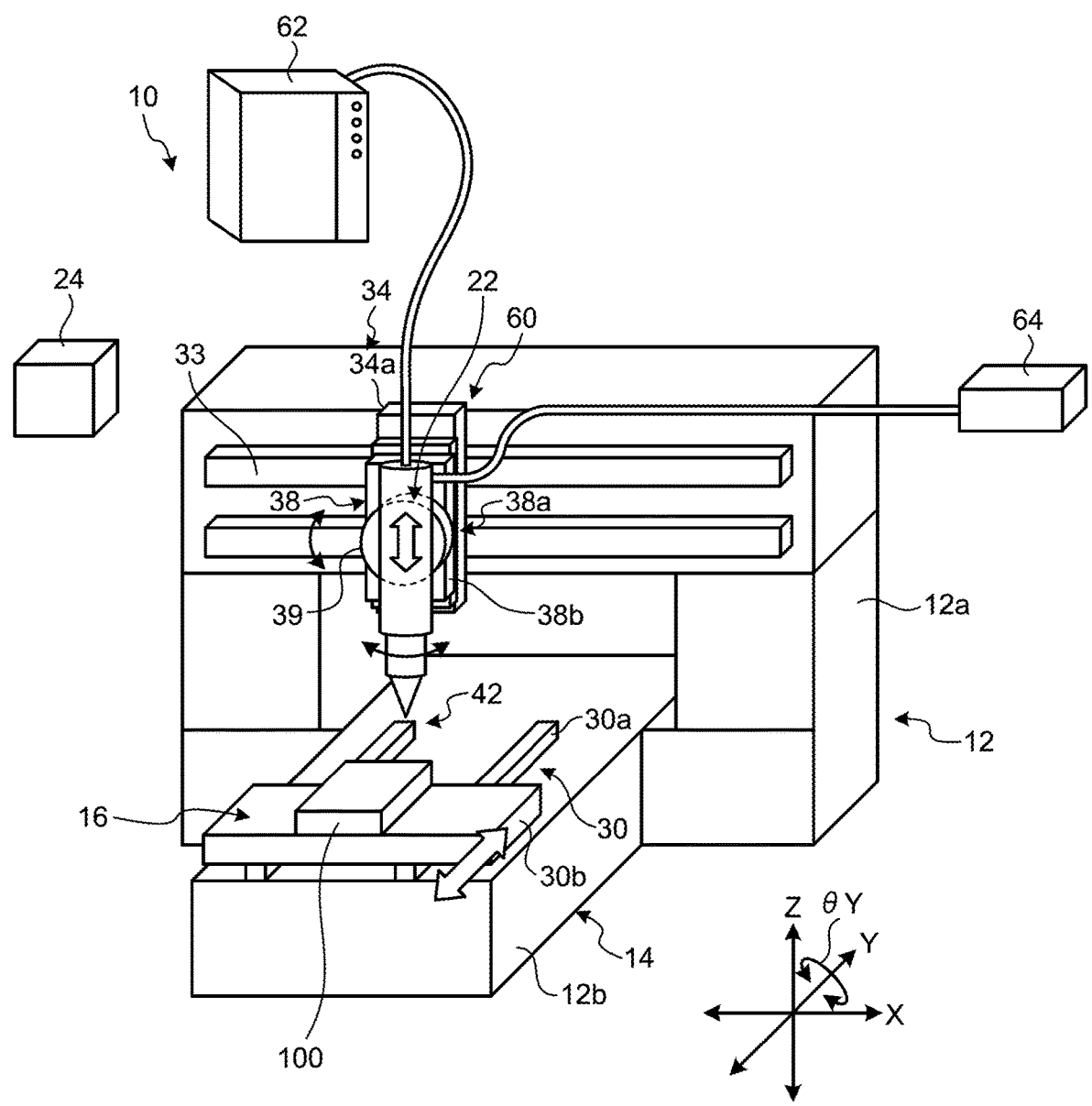
FIG. 1 is a schematic diagram illustrating a schematic configuration of a laser machining device according to an embodiment of the present invention.
Figure 2:
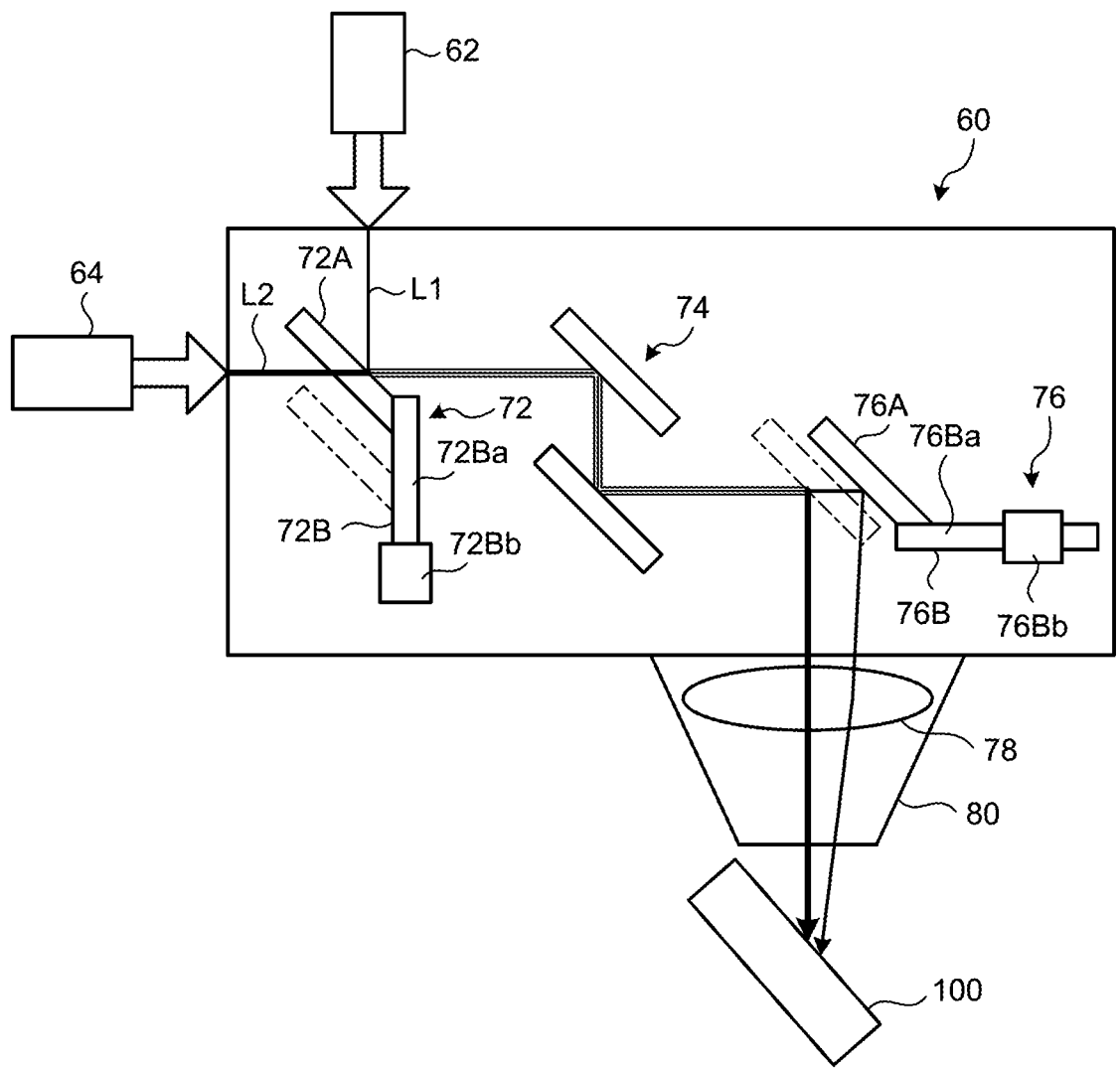
FIG. 2 is a schematic diagram illustrating a schematic configuration of a laser machining head.
Figure 3:
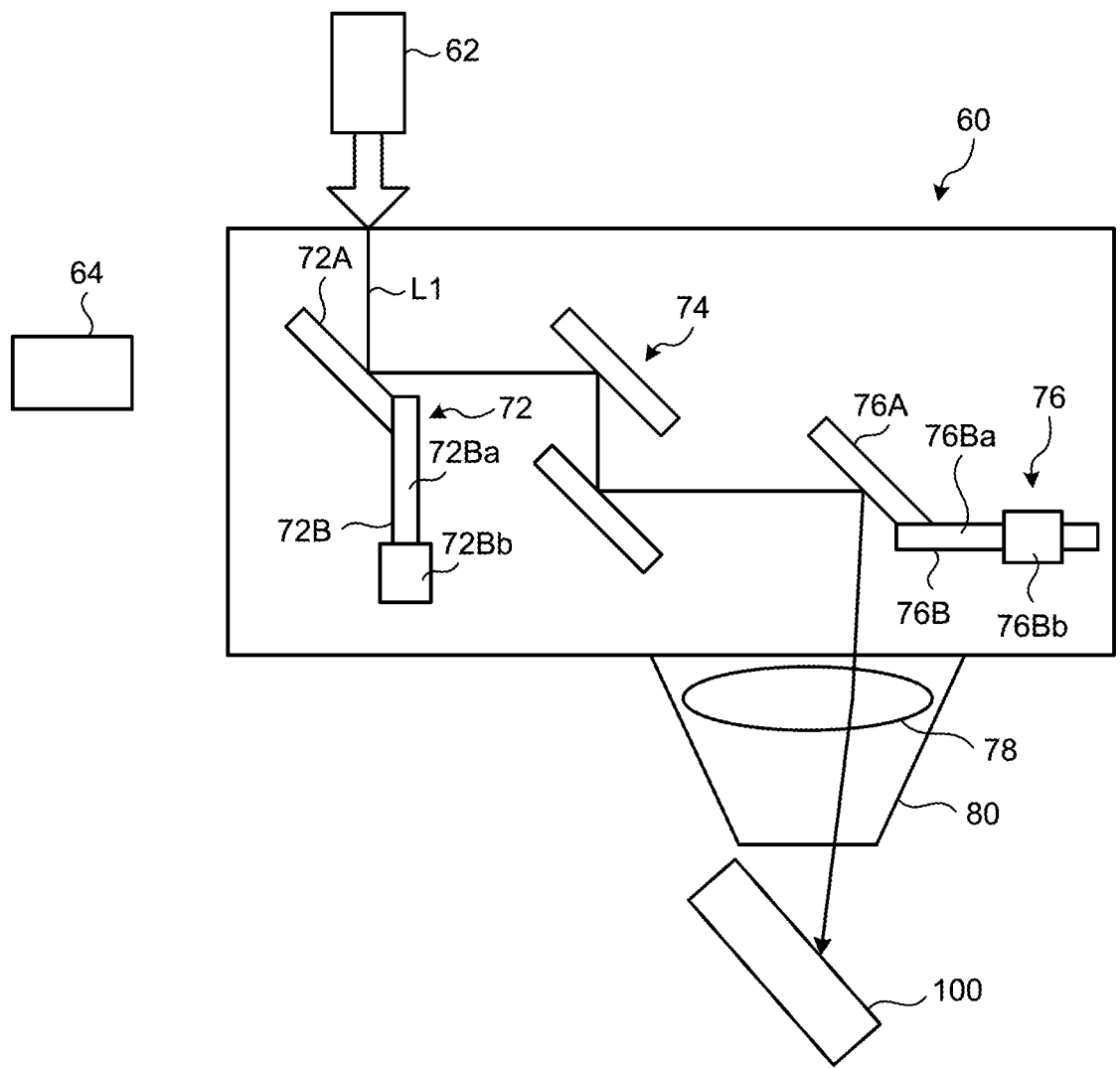
FIG. 3 is an explanatory diagram for describing operation of the laser machining head.
Figure 4:
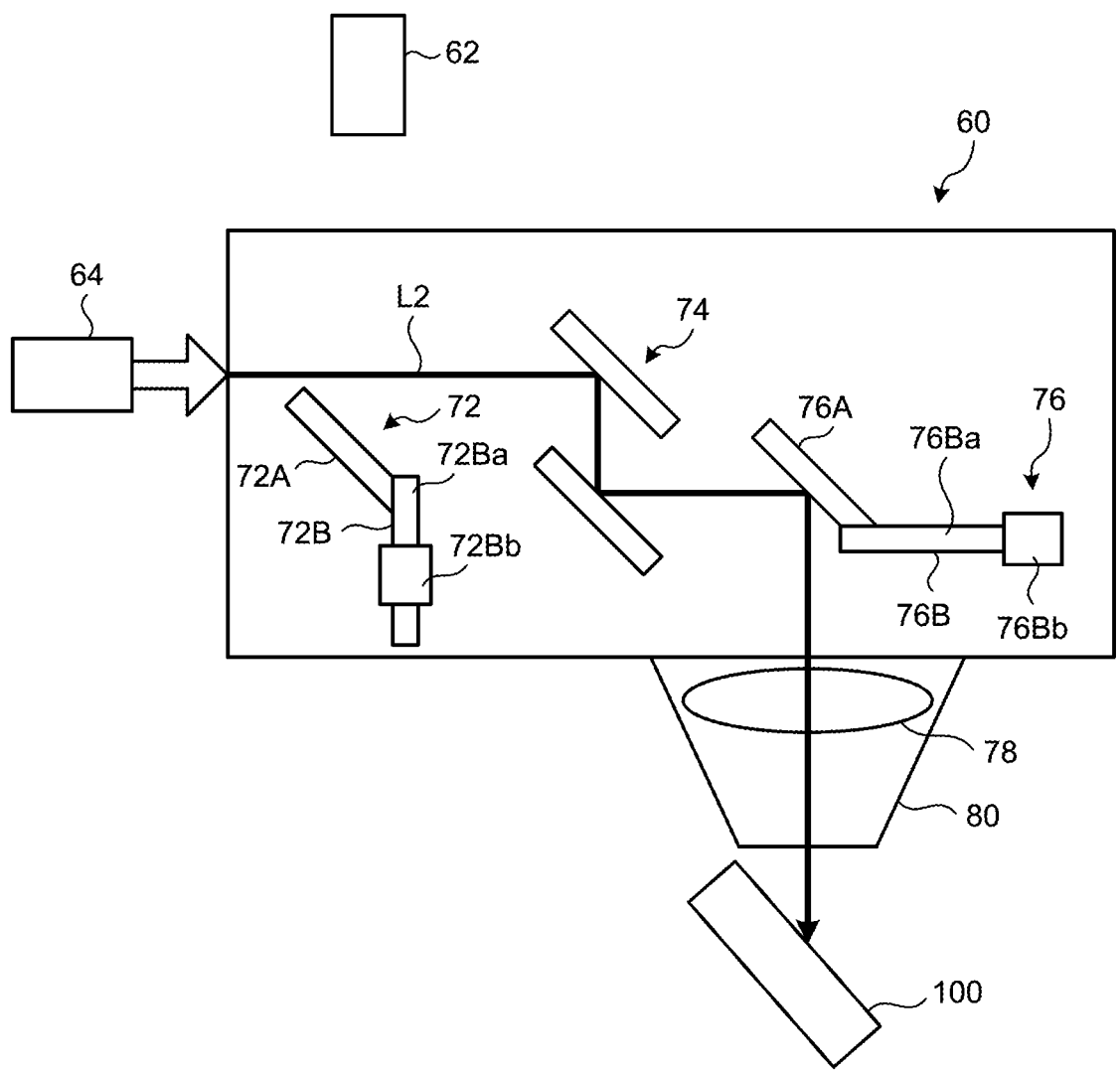
FIG. 4 is an explanatory diagram for describing operation of the laser machining head.

FIG. 1 is a schematic diagram illustrating a schematic configuration of a laser machining device according to the present embodiment. FIG. 2 is a schematic diagram illustrating a schematic configuration of a laser machining head. FIG. 3 and FIG. 4 are explanatory diagrams for describing operation of the laser machining head.

As illustrated in FIG. 1, a laser machining device 10 is a device configured to perform various kinds of machining, such as cutting and boring, on an object to be machined 100. The type of machining is not particularly limited, and the laser machining device 10 in the present embodiment performs cutting in boring. The laser machining device 10 also measures the object to be machined 100.

The laser machining device 10 includes a frame 12, a movement unit 14, a stage unit 16, a laser machining unit 22 including a laser machining head 60, and a control unit 24. The laser machining device 10 irradiates the object to be machined 100 held by the stage unit 16 with laser from the laser machining unit 22 to perform laser machining on the object to be machined 100. In the present embodiment, the horizontal surface is an XY plane including an X-axis direction and a Y-axis direction orthogonal to the X axis, and a direction orthogonal to the horizontal surface is a Z-axis direction. A direction about the Y axis is a θY direction.

The frame 12 is a casing of the laser machining device 10, and is fixed to an installation surface such as the ground or a base. The frame 12 has columns 12a and a base 12b inserted in a space between the columns 12a. A fixation portion of the movement unit 14 is fixed to the frame 12. Thus, the laser machining device 10 in the present embodiment is what is called a double column machining device in which the movement unit 14 is fixed to the columns 12a and the base 12b of the frame 12 and the movement unit 14 relatively moves the object to be machined 100 and the laser machining unit 22.

The movement unit 14 relatively moves the object to be machined 100 and the laser machining head 60. The movement unit 14 includes a Y-axis movement mechanism 30, an X-axis movement mechanism 34, a Z-axis movement mechanism 38, and a θY rotation mechanism 39. The Y-axis movement mechanism 30 includes rails 30a disposed on the base 12b of the frame 12 and extending in the Y-axis direction, and a Y-axis movement member 30b configured to move along the rails 30a. In the Y-axis movement mechanism 30, the stage unit 16 is fixed to the Y-axis movement member 30b. The Y-axis movement mechanism 30 moves the Y-axis movement member 30b along the rails 30a, thereby moving the stage unit 16 in the Y-axis direction. The Y-axis movement mechanism 30 can use various kinds of mechanisms as a mechanism configured to move the Y-axis movement member 30b in the Y-axis direction. For example, a mechanism in which a ball screw is inserted to the Y-axis movement member 30b and the ball screw is rotated by a motor, a linear motor mechanism, or a belt mechanism can be used. Various mechanisms can be similarly used for the X-axis movement mechanism 34 and the Z-axis movement mechanism 38.

The X-axis movement mechanism 34 includes rails 33 disposed on the column 12a of the frame 12 and extending in the X-axis direction, and an X-axis movement member 34a configured to move along the rails 33. In the X-axis movement mechanism 34, the Z-axis movement mechanism 38 is fixed to the X-axis movement member 34a. The X-axis movement mechanism 34 moves the X-axis movement member 34a along the rails 33, thereby moving the Z-axis movement mechanism 38 in the X-axis direction. The Z-axis movement mechanism 38 includes a rail 38a fixed to the X-axis movement member 34a and extending in the Z-axis direction, and a Z-axis movement member 38b configured to move along the rail 38a. In the Z-axis movement mechanism 38, the θY rotation mechanism 39 is fixed to the Z-axis movement member 38b. The Z-axis movement mechanism 38 moves the θY rotation mechanism 39 along the rail 38a, thereby moving the θY rotation mechanism 39 in the Z-axis direction. The θY rotation mechanism 39 is fixed to the Z-axis movement member 38b, and the laser machining head 60 is fixed to the θY rotation mechanism 39. The θY rotation mechanism 39 rotates the laser machining head 60 in the θY direction with respect to the Z-axis movement member 38b, thereby rotating the laser machining head 60 in the θY direction.

The movement unit 14 uses the Y-axis movement mechanism 30, the X-axis movement mechanism 34, and the Z-axis movement mechanism 38 to relatively move the object to be machined 100 and the laser machining head 60 in the X-axis direction, the Y-axis direction, and the Z-axis direction. The movement unit 14 uses the θY rotation mechanism 39 to rotate the laser machining head 60 with respect to the object to be machined 100. In this manner, the orientation of laser applied from the laser machining head 60 to the object to be machined 100 can be adjusted. The movement unit 14 may include a mechanism configured to rotate the laser machining head 60 about the X axis. The mechanism configured to adjust the laser irradiation direction may be provided to the laser machining head 60.

The stage unit 16 is disposed on the Y-axis movement member 30b of the Y-axis movement mechanism 30. The stage unit 16 is a stage configured to support the object to be machined 100. The stage unit 16 in the present embodiment is a member integrated with the Y-axis movement member 30b. In other words, the Y-axis movement member 30b is a stage of the stage unit 16. However, another support member may be provided on the Y-axis movement member 30b as a stage. In the stage unit 16, the Y-axis movement mechanism 30 serves as a stage movement mechanism 42 configured to move the object to be machined 100. The stage unit 16 includes a fixation mechanism configured to fix the object to be machined 100 to a predetermined position on the Y-axis movement member 30b. The stage unit 16 may further include, as the stage movement mechanism 42, an adjustment mechanism configured to adjust the orientation, that is, the posture, of the object to be machined 100 with respect to the Y-axis movement member 30b. Specifically, the stage unit 16 may include a mechanism configured to rotate the object to be machined 100 as the stage movement mechanism 42.

The laser machining unit 22 includes the laser machining head 60, a fiber laser light source (first laser light source) 62, and a short-pulsed laser light source (second laser light source) 64. The fiber laser light source 62 is a device configured to output fiber laser (first laser) L1, which is laser having a pulse width of sub-milliseconds or more, with an optical fiber as a medium. As the fiber laser output device, for example, a Fabry-Perot fiber laser output device or a ring fiber laser output device can be used, and laser is oscillated when these output devices are excited. As fibers for the fiber laser output device, for example, silica glass added with a rare-earth element such as erbium (Er), neodymium (Nd), and ytterbium (Yb) can be used. Note that, in the present embodiment, laser that oscillates pulses on the order of microseconds or less, such as YAG laser and YVO4 laser, can be used as the fiber laser (first laser) L1. The short-pulsed laser light source 64 outputs laser with a short pulse, for example, a frequency of 20 kHz. As a short-pulsed laser output device, for example, a titanium-sapphire laser can be used as a laser oscillation source, and can oscillate a pulse having a pulse width of 100 microseconds or less. In the present embodiment, the short-pulsed laser (second laser) L2 outputs laser having a short pulse width of 100 microseconds or less. Note that the laser machining unit 22 sets the short-pulsed laser L2 to a short-pulse having a pulse width of preferably 100 nanoseconds or less, more preferably less than 1 nanosecond.

Next, the laser machining head 60 is described. As illustrated in FIG. 2, the fiber laser L1 output from the fiber laser light source 62 and the short-pulsed laser L2 output from the short-pulsed laser light source 64 enter the laser machining head 60, and the laser machining head 60 irradiates the object to be machined 100 with one of the incident lasers L1 and L2 to perform laser machining of the object to be machined 100. Note that the fiber laser L1 output from the fiber laser light source 62 and the short-pulsed laser L2 output from the short-pulsed laser light source 64 are guided to the laser machining head 60 through optical members configured to guide laser light, such as optical fibers.

The laser machining head 60 includes a switch mechanism 72, a laser scanning unit 74, an irradiation angle change mechanism 76, a condensing optical system 78, and a nozzle 80.

The switch mechanism 72 is a mechanism configured to switch whether the fiber laser L1 output from the fiber laser light source 62 is caused to enter the laser scanning unit 74 or the short-pulsed laser L2 output from the short-pulsed laser light source 64 is caused to enter the laser scanning unit 74. The switch mechanism 72 includes a mirror 72A configured to reflect the lasers L1 and L2 and a slide movement mechanism unit 72B configured to slide and move the mirror 72A. The slide movement mechanism unit 72B includes a support rod 72Ba coupled to the mirror 72A and a drive unit 72Bb configured to slide and move the support rod 72Ba. The switch mechanism 72 uses the drive unit 72Bb to dispose the mirror 72A at a position at which the fiber laser L1 and the short-pulsed laser L2 intersect and overlap each other as indicated by the solid line in FIG. 2 and at a position away from the path of the short-pulsed laser L2 as indicated by the chain line in FIG. 2 through the support rod 72Ba.

As illustrated in FIG. 3, the switch mechanism 72 uses the drive unit 72Bb to dispose the mirror 72A at a position at which the fiber laser L1 and the short-pulsed laser L2 overlap with each other through the support rod 72Ba, so that the fiber laser L1 is reflected by the mirror 72A and the short-pulsed laser L2 is blocked, thereby causing the fiber laser L1 to enter the laser scanning unit 74. Note that, in the example illustrated in FIG. 3, the short-pulsed laser L2 is blocked by the short-pulsed laser light source 64, and hence the short-pulsed laser L2 does not reach the mirror 72A.

As illustrated in FIG. 4, the switch mechanism 72 uses the drive unit 72Bb to dispose the mirror 72A at a position away from the path of the short-pulsed laser L2 through the support rod 72Ba, that is, retreat the mirror 72A such that the mirror 72A is not disposed at the position at which the fiber laser L1 and the short-pulsed laser L2 overlap each other, and the short-pulsed laser L2 is directly transmitted, thereby causing the short-pulsed laser L2 to enter the laser scanning unit 74. When the short-pulsed laser L2 is directly transmitted, a shutter may be provided in front of the mirror 72A to block the fiber laser L1. Note that, in the example illustrated in FIG. 4, the fiber laser L1 is blocked by the fiber laser light source 62, and hence the fiber laser L1 does not reach the mirror 72A.

Note that, although not specifically illustrated, the switch mechanism 72 may have, in addition to the above-mentioned configuration, a configuration in which, for example, the mirror 72A is provided to rails so as to be slidingly movable and the drive unit 72Bb slidingly moves the mirror 72A along the rails. The switch mechanism 72 may reflect the short-pulsed laser L2 by the mirror 72A and directly transmit the fiber laser L1 such that the short-pulsed laser L2 and the fiber laser L1 enter the laser scanning unit 74.

Note that, although not illustrated, the laser machining head 60 is provided with a collimator optical system configured to collimate the fiber laser L1 output from the fiber laser light source 62 and emit the collimated fiber laser L1 toward the switch mechanism 72. The laser machining head 60 is provided with a collimator optical system configured to collimate the short-pulsed laser L2 output from the short-pulsed laser light source 64 and emit the collimated short-pulsed laser L2 toward the switch mechanism 72.

The laser scanning unit 74 is configured to scan the irradiation angle change mechanism 76 with the fiber laser L1 or the short-pulsed laser L2 that has passed through the switch mechanism 72. For example, a galvanoscanner is used. Specifically, the laser scanning unit 74 refracts the path of the fiber laser L1 or the short-pulsed laser L2 that has passed through the switch mechanism 72 such that the path is aligned with an optical axis of incidence in the irradiation angle change mechanism 76.

The irradiation angle change mechanism 76 changes the position at which the fiber laser L1 or the short-pulsed laser L2 enters the condensing optical system 78, thereby changing the irradiation angle of the laser L1 or L2. The irradiation angle change mechanism 76 includes a mirror 76A configured to reflect the laser and a slide movement mechanism unit 76B configured to slidingly move the mirror 76A. The slide movement mechanism unit 76B includes a support rod 76Ba coupled to the mirror 76A and a drive unit 76Bb configured to slidingly move the support rod 76Ba. The irradiation angle change mechanism 76 uses the drive unit 76Bb to dispose the mirror 76A at different positions that are slidingly moved along the extending direction of the optical axes of the fiber laser L1 and the short-pulsed laser L2 as indicated by the solid line in FIG. 2 through the support rod 76Ba.

As illustrated in FIG. 3, the irradiation angle change mechanism 76 uses the drive unit 76Bb to dispose the mirror 76A at, for example, a position retreated along the optical axis of the fiber laser L1 through the support rod 76Ba, so that the fiber laser L1 is reflected by the mirror 76A and the fiber laser L1 enters the condensing optical system 78 while being shifted (translated) from the center axis of the condensing optical system 78. Note that, in the example illustrated in FIG. 3, the short-pulsed laser L2 is blocked by the short-pulsed laser light source 64, and hence the short-pulsed laser L2 does not reach the mirror 76A. Note that the irradiation angle change mechanism 76 can cause the short-pulsed laser L2 to enter the condensing optical system 78 while being shifted (translated) from the center axis thereof through the same path.

As illustrated in FIG. 4, the irradiation angle change mechanism 76 uses the drive unit 76Bb to dispose the mirror 76A at, for example, a position ahead along the optical axis of the short-pulsed laser L2 through the support rod 76Ba, so that the short-pulsed laser L2 is reflected by the mirror 76A and the short-pulsed laser L2 enters the center axis of the condensing optical system 78. In the example illustrated in FIG. 4, the fiber laser L1 is blocked by the fiber laser light source 62, and hence the fiber laser L1 does not reach the mirror 76A. Note that the irradiation angle change mechanism 76 can make the fiber laser L1 incident on the center axis of the condensing optical system 78 through the same path.

The condensing optical system 78 includes a plurality of lenses (one in the figures), and the laser L1 or L2 that has passed through the irradiation angle change mechanism 76 is condensed by the lenses to form a laser L1 or L2 having a predetermined focal length and a predetermined focal depth. The condensing optical system 78 irradiates the object to be machined 100 with the laser L1 or L2 having a predetermined spot diameter. It is preferred that the condensing optical system 78 have a cooling mechanism. Examples of the cooling mechanism include a cooling jacket for cooling the lenses.

The nozzle 80 has a hollow conical shape whose diameter gradually decreases toward the traveling direction of the laser L1 or L2. The nozzle 80 is mounted to the condensing optical system 78. The nozzle 80 has a transmissive member for preventing the condensing optical system 78 from being contaminated by spatters produced at a machining point on the object to be machined 100. The nozzle 80 is supplied with assist gas from an assist gas supply source (not illustrated), and can eject the assist gas toward the object to be machined 100.

In the present embodiment, as assist gas, for example, air, nitrogen gas, oxygen gas, argon gas, xenon gas, helium gas, or mixture gas thereof can be used. The use of oxygen gas, which can utilize oxidation reaction heat for treatment, as assist gas can improve the machining speed for the object to be machined 100 such as metal. The use of nitrogen gas or argon gas, which suppress the generation of an oxide layer as a heat-affected layer that has heat influence, as assist gas can further improve the machining precision for the object to be machined 100 such as metal. The gas type and the mixture ratio of the assist gas and the ejection amount (pressure) from the nozzle 80 can be changed depending on machining conditions such as the type of the object to be machined 100 and the machining mode. For example, when gas containing oxygen is used as assist gas for metal, the machining speed can be improved, and dross is increased in temperature by oxidation reaction and the fluidity thereof improves such that the dross is easily removed to improve the quality. The use of inert gas such as nitrogen gas can suppress oxidation for metal and generation of an oxide metal layer. If spatter is generated, when the protective layer is an oxide and nitrogen gas is used as assist gas for metal machining, the generated spatter becomes a nitride, and hence the adhesion of the spatter adhering on the protective layer can be suppressed.

The laser machining unit 22 may include photographing means for taking an image of the position to be irradiated with laser, for example, a camera having a charge coupled device (CCD) image sensor. In this manner, the laser irradiation position can be adjusted based on an acquired image.

In the laser machining unit 22, the laser machining head 60 irradiates the object to be machined 100 with laser output from the fiber laser light source 62 or the short-pulsed laser light source 64, thereby foaming a through hole. The laser machining unit 22 can move the laser irradiation position to cut the object to be machined along a line and cut off the object to be machined.

The control unit 24 controls the operation of the units in the movement unit 14, the stage unit 16, and the laser machining unit 22. The control unit 24 controls the operation of the movement unit 14 and the stage movement mechanism 42 in the stage unit 16 to relatively move the object to be machined 100 and the laser machining head 60. The control unit 24 controls the driving of the laser machining unit 22 to control laser machining. Specifically, the control unit 24 determines whether to perform machining by the fiber laser L1 or by the short-pulsed laser L2 based on a machining procedure of the object to be machined 100, and operates the units including the switch mechanism 72 and the irradiation angle change mechanism 76 based on the determination and irradiates the object to be machined 100 with the laser.

Figure 5:
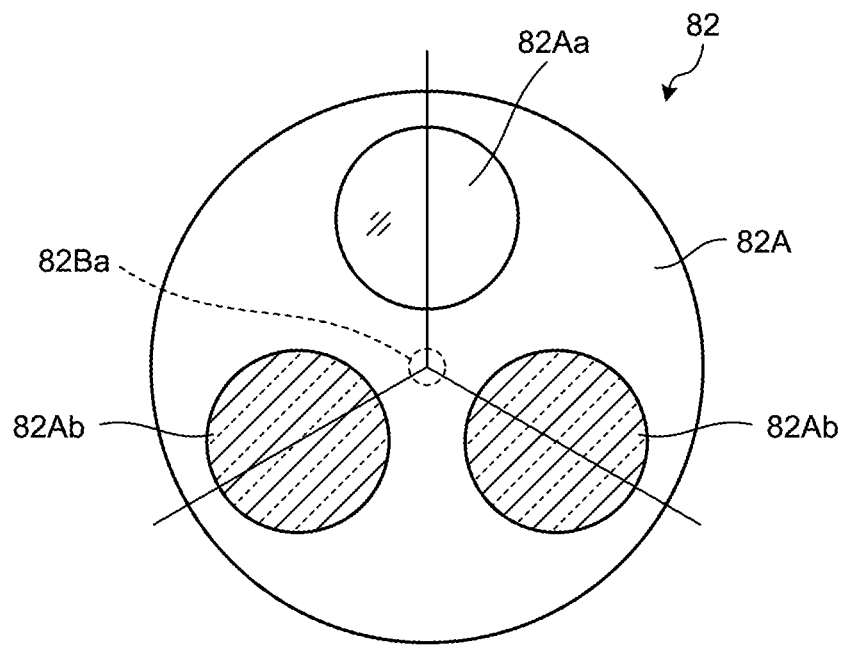
FIG. 5 is a schematic diagram illustrating another example of a switch mechanism.
Figure 6:
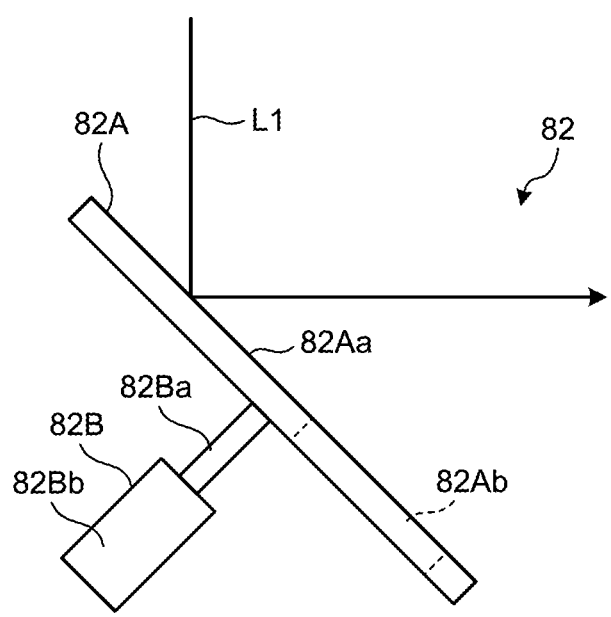
FIG. 6 is an explanatory diagram for describing operation of another example of the switch mechanism.
Figure 7:
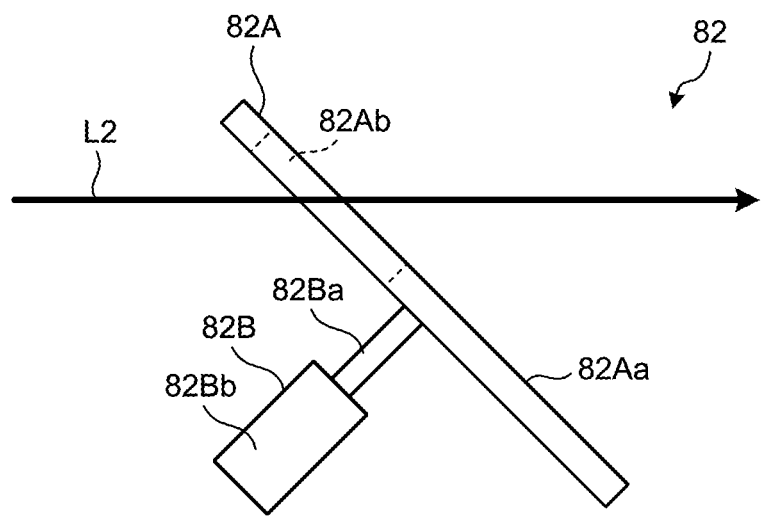
FIG. 7 is an explanatory diagram for describing the operation of another example of the switch mechanism.
Figure 8:
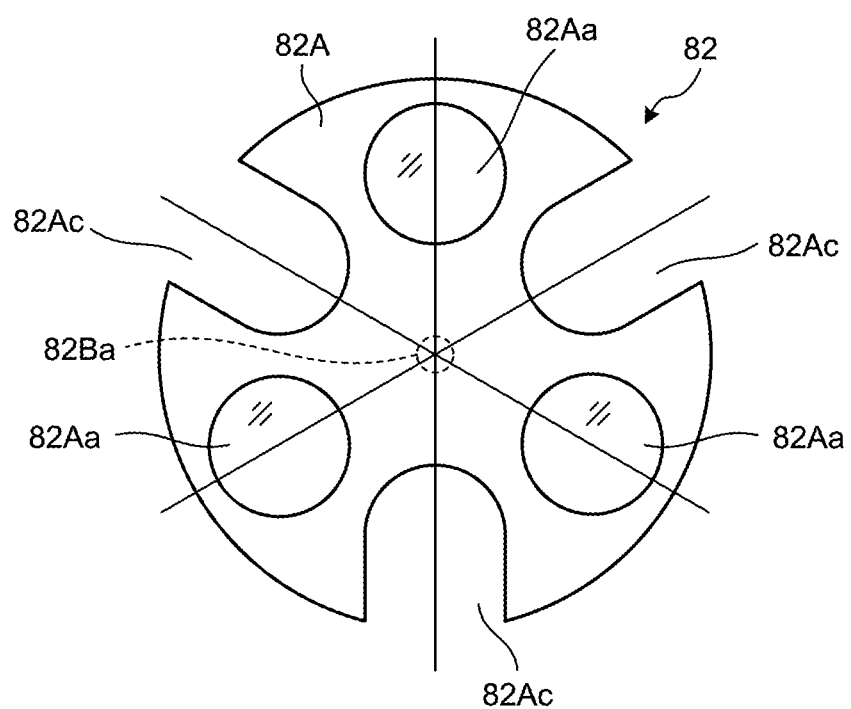
FIG. 8 is a schematic diagram illustrating a modification of the other example of the switch mechanism.

FIG. 5 is a schematic diagram illustrating another example of the switch mechanism. FIG. 6 and FIG. 7 are explanatory diagrams for describing operation of the other example of the switch mechanism. FIG. 8 is a schematic diagram illustrating a modification of the other example of the switch mechanism.

As illustrated in FIG. 5 to FIG. 7, a switch mechanism 82 in the other example is a mechanism configured to switch whether the fiber laser L1 output from the fiber laser light source 62 is caused to enter the laser scanning unit 74 or the short-pulsed laser L2 output from the short-pulsed laser light source 64 is caused to enter the laser scanning unit 74, and is used in place of the above-mentioned switch mechanism 72. The switch mechanism 82 includes a rotating disc 82A and a rotational movement mechanism unit 82B. The rotating disc 82A is provided to be rotatable about a rotation shaft 82Ba of the rotational movement mechanism unit 82B. The rotating disc 82A is provided with a mirror 82Aa at a position that rotationally moves when the rotating disc 82A rotates about the rotation shaft 82Ba. The rotating disc 82A is provided with quartz 82Ab serving as transmission means at a position that rotationally moves when the rotating disc 82A rotates about the rotation shaft 82Ba. In the present embodiment, the rotating disc 82A is provided with the mirror 82Aa at one location centered at the rotation shaft 82Ba and provided with the quartz 82Ab at two locations centered at the rotation shaft 82Ba at 120 degrees from the mirror 82Aa. Thus, when the rotating disc 82A rotates about the rotation shaft 82Ba, the mirror 82Aa or the quartz 82Ab rotationally moves and is disposed at a position at which the fiber laser L1 and the short-pulsed laser L2 intersect and overlap each other. The rotational movement mechanism unit 82B has the rotation shaft 82Ba rotatably supporting the rotating disc 82A, and a drive unit 82Bb configured to rotationally drive the rotation shaft 82Ba.

The switch mechanism 82 in the other example as configured above uses the drive unit 82Bb to rotate the rotating disc 82A through the rotation shaft 82Ba, and when the mirror 82Aa is disposed at a position at which the fiber laser L1 and the short-pulsed laser L2 intersect and overlap each other, as illustrated in FIG. 6, reflects the fiber laser L1 by the mirror 82Aa and blocks the short-pulsed laser L2 to obtain the state in which the fiber laser L1 enters the laser scanning unit 74. On the other hand, the switch mechanism 82 in the other example uses the drive unit 82Bb to rotate the rotating disc 82A through the rotation shaft 82Ba, and when the quartz 82Ab is disposed at a position at which the fiber laser L1 and the short-pulsed laser L2 intersect and overlap each other, as illustrated in FIG. 7, transmits the short-pulsed laser L2 by the quartz 82Ab and blocks the fiber laser L1 to obtain the state in which the short-pulsed laser L2 enters the laser scanning unit 74 not through the mirror 82Aa. Then, the positions of the mirror 82Aa and the quartz 82Ab can be switched by using the drive unit 82Bb to rotate the rotation shaft 82Ba in the forward and reverse directions in the range of 120 degrees, and the other quartz 82Ab can be used as a spare. Although not specifically illustrated, two mirrors 82Aa and one quartz 82Ab may be provided, and the other mirror 82Aa may be used as a spare.

Note that, as illustrated in FIG. 8, the rotating disc 82A may be configured such that the mirrors 82Aa are provided at three locations centered at the rotation shaft 82Ba every 120 degrees and the notches 82Ac serving as transmission means are provided at three locations centered at the rotation shaft 82Ba every 120 degrees at the middle of the mirrors 82Aa. In this configuration, the positions of the mirror 82Aa and the notch 82Ac can be switched by using the drive unit 82Bb to rotate the rotation shaft 82Ba in the forward and reverse directions in the range of 60 degrees, and the other two mirrors 82Aa and two notches 82Ac can be used as spares. Note that, in the rotating disc 82A illustrated in FIG. 8, the notches 82Ac may be quartz 82Ab. In the rotating disc 82A illustrated in FIG. 5, the quartz 82Ab may be notches 82Ac.

Figure 9:
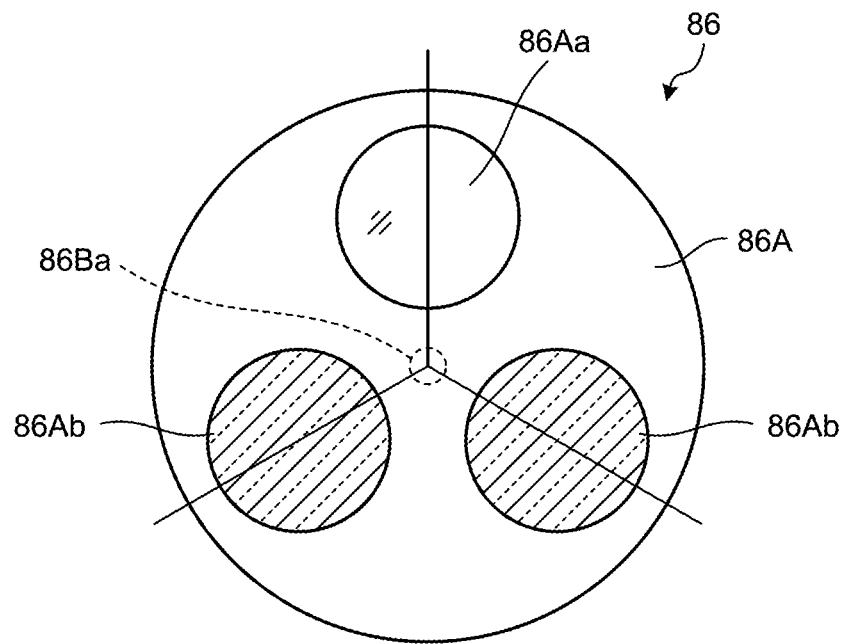
FIG. 9 is a schematic diagram illustrating another example of the irradiation angle change mechanism.
Figure 10:
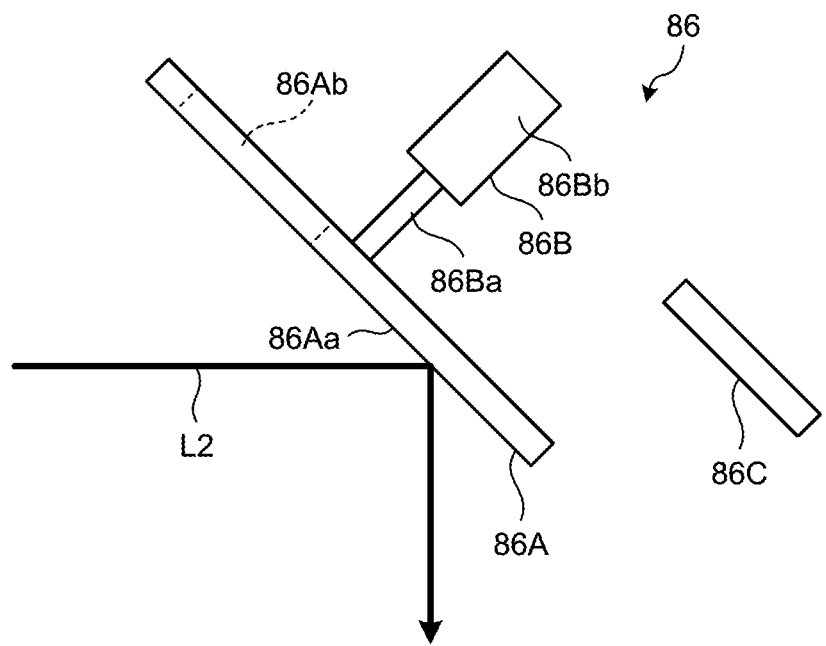
FIG. 10 is an explanatory diagram for describing operation of the other example of the irradiation angle change mechanism.
Figure 11:
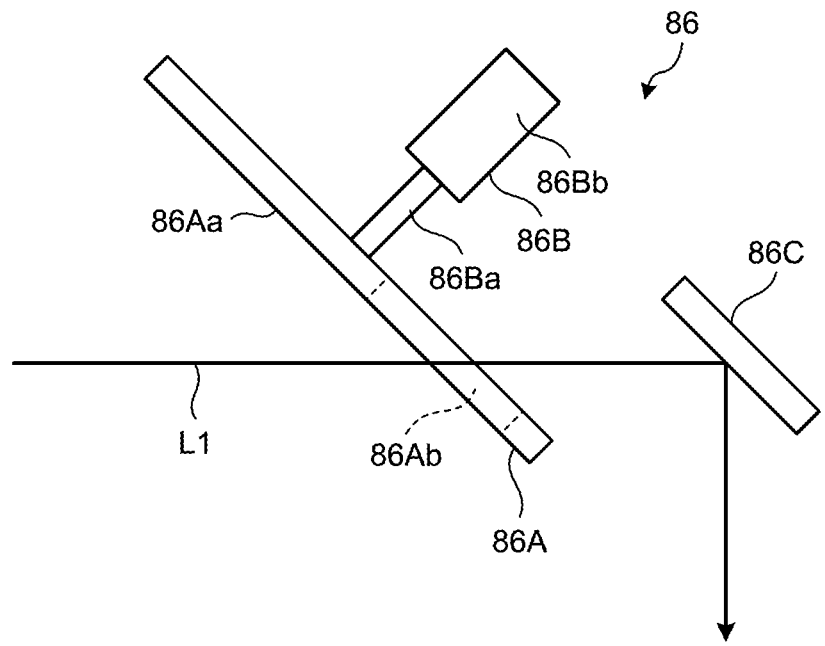
FIG. 11 is an explanatory diagram for describing the operation of the other example of the irradiation angle change mechanism.
Figure 12:
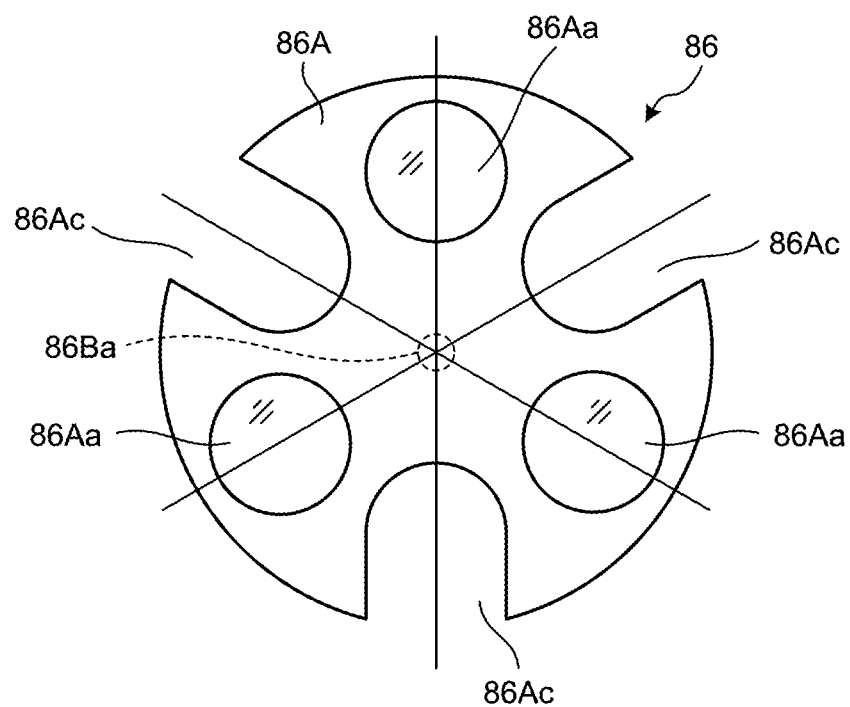
FIG. 12 is a schematic diagram illustrating a modification of the other example of the irradiation angle change mechanism.

FIG. 9 is a schematic diagram illustrating another example of the irradiation angle change mechanism. FIG. 10 and FIG. 11 are explanatory diagrams for describing operation in the other example of the irradiation angle change mechanism. FIG. 12 is a schematic diagram illustrating a modification of the other example of the irradiation angle change mechanism.

As illustrated in FIG. 9 to FIG. 11, an irradiation angle change mechanism 86 in the other example is a mechanism configured to change a position at which the fiber laser L1 or the short-pulsed laser L2 enters the condensing optical system 78, and is used in place of the above-mentioned irradiation angle change mechanism 76. The irradiation angle change mechanism 86 includes a rotating disc 86A, a rotational movement mechanism unit 86B, and a fixed mirror 86C. The rotating disc 86A is provided to be rotatable about a rotation shaft 86Ba of the rotational movement mechanism unit 86B. The rotating disc 86A is provided with a mirror 86Aa as a first mirror at a position that rotationally moves when the rotating disc 86A rotates about the rotation shaft 86Ba. The rotating disc 86A is provided with quartz 86Ab serving as transmission means at a position that rotationally moves when the rotating disc 86A rotates about the rotation shaft 86Ba. In the present embodiment, the rotating disc 86A is provided with the mirror 86Aa at one location centered at the rotation shaft 86Ba and provided with the quartz 86Ab at two locations centered at the rotation shaft 86Ba at 120 degrees from the mirror 86Aa. Thus, when the rotating disc 86A rotates about the rotation shaft 86Ba, the mirror 86Aa or the quartz 86Ab rotationally moves and is disposed on the optical axis of the fiber laser L1 or the short-pulsed laser L2. The rotational movement mechanism unit 86B has the rotation shaft 86Ba rotatably supporting the rotating disc 86A, and a drive unit 86Bb configured to rotationally drive the rotation shaft 86Ba. The fixed mirror 86C serves as a second mirror, and is disposed at a position retreated along the optical axis with respect to the rotating disc 86A on the optical axis of the fiber laser L1 or the short-pulsed laser L2.

The irradiation angle change mechanism 86 in the other example as configured above uses the drive unit 86Bb to rotate the rotating disc 86A through the rotation shaft 86Ba, and when the mirror 82Aa is disposed on the optical axis of the fiber laser L1 or the short-pulsed laser L2, for example, as illustrated in FIG. 10, reflects the short-pulsed laser L2 by the mirror 86Aa to obtain the state in which the short-pulsed laser L2 enters the condensing optical system 78 on the center axis thereof. On the other hand, the irradiation angle change mechanism 86 in the other example uses the drive unit 86Bb to rotate the rotating disc 86A through the rotation shaft 86Ba, and when the quartz 86Ab is disposed on the optical axis of the fiber laser L1 or the short-pulsed laser L2, for example, as illustrated in FIG. 11, transmits the fiber laser L1 by the quartz 82Ab and reflects the fiber laser L1 by the fixed mirror 86C to obtain the state in which the fiber laser L1 enters the condensing optical system 78 while being shifted (translated) from the center axis thereof. Then, the positions of the mirror 86Aa and the quartz 86Ab can be switched by using the drive unit 86Bb to rotate the rotation shaft 86Ba in the forward and reverse directions in the range of 120 degrees, and the other quartz 86Ab can be used as a spare. Although not specifically illustrated, two mirrors 86Aa and one quartz 86Ab may be provided, and one mirror 86Aa may be used as a spare.

Note that, as illustrated in FIG. 12, the rotating disc 86A may be configured such that the mirrors 86Aa are provided at three locations centered at the rotation shaft 86Ba every 120 degrees and the notches 86Ac serving as transmission means are provided at three locations centered at the rotation shaft 86Ba every 120 degrees at the middle of the mirrors 86Aa. In this configuration, the positions of the mirror 86Aa and the notch 86Ac can be switched by using the drive unit 86Bb to rotate the rotation shaft 86Ba in the forward and reverse directions in the range of 60 degrees, and the other two mirrors 86Aa and two notches 86Ac can be used as spares. Note that, in the rotating disc 86A illustrated in FIG. 12, the notches 86Ac may be quartz 86Ab. In the rotating disc 86A illustrated in FIG. 9, the quartz 86Ab may be notches 86Ac.

Figure 13:
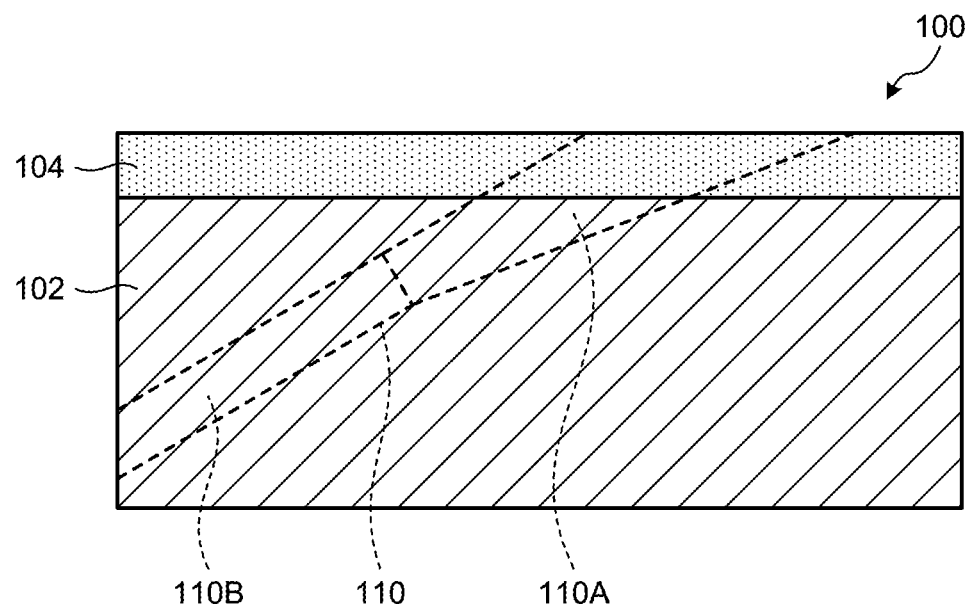
FIG. 13 is a schematic diagram illustrating an example of the structure of an object to be machined.
Figure 14:
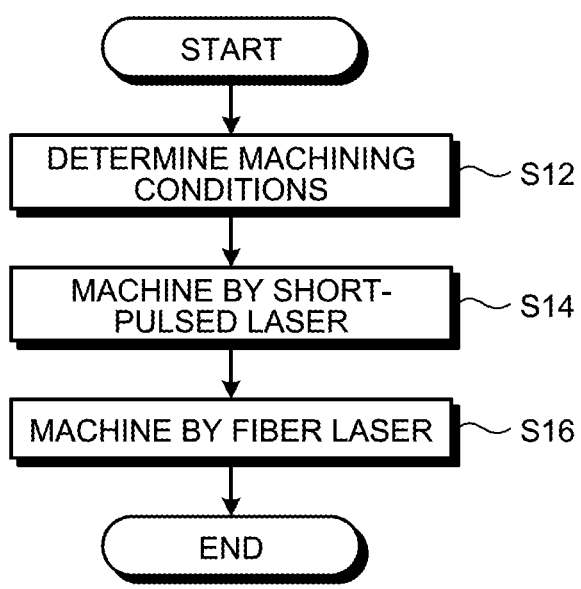
FIG. 14 is a flowchart for describing the operation of the laser machining device.
Figure 15:
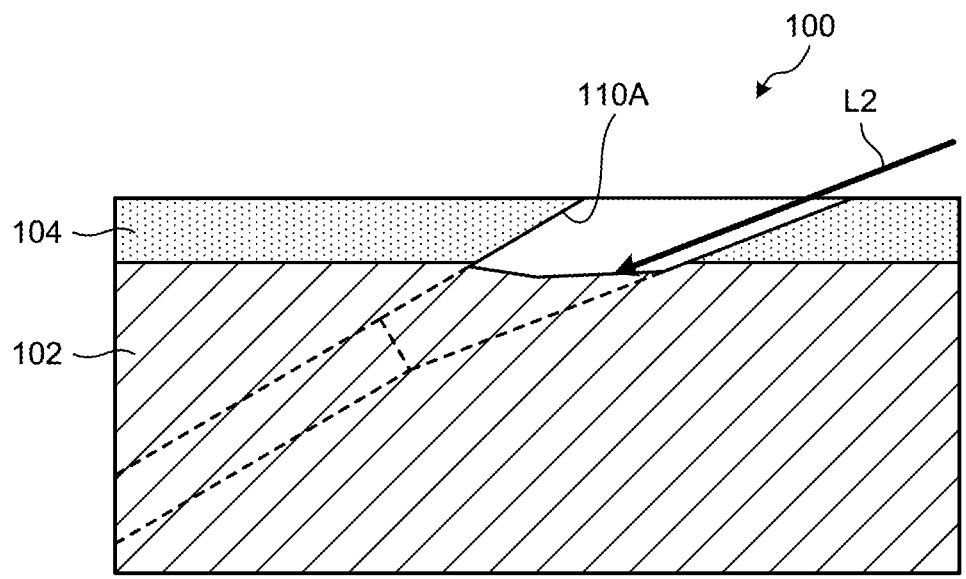
FIG. 15 is an explanatory diagram for describing the operation of the laser machining device.
Figure 16:
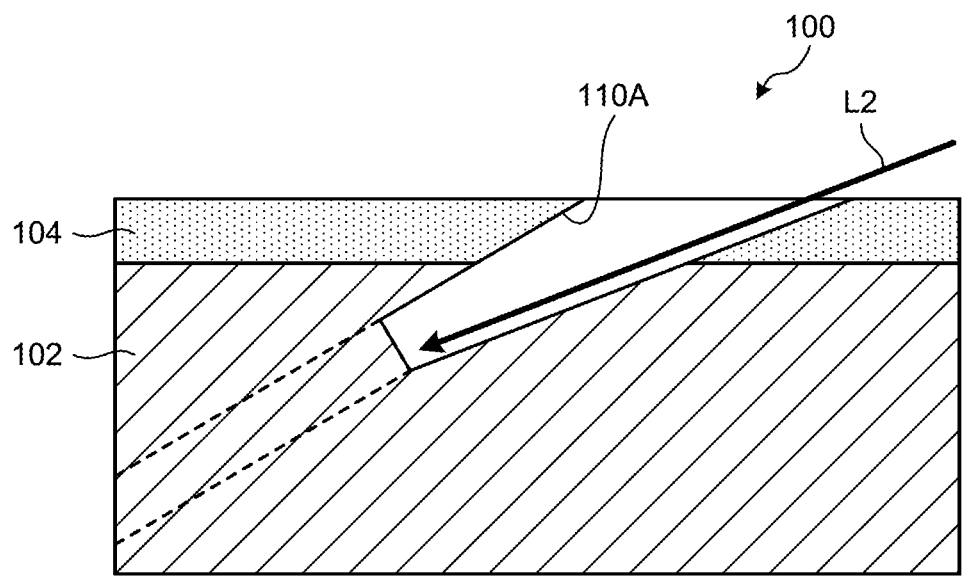
FIG. 16 is an explanatory diagram for describing the operation of the laser machining device.
Figure 17:
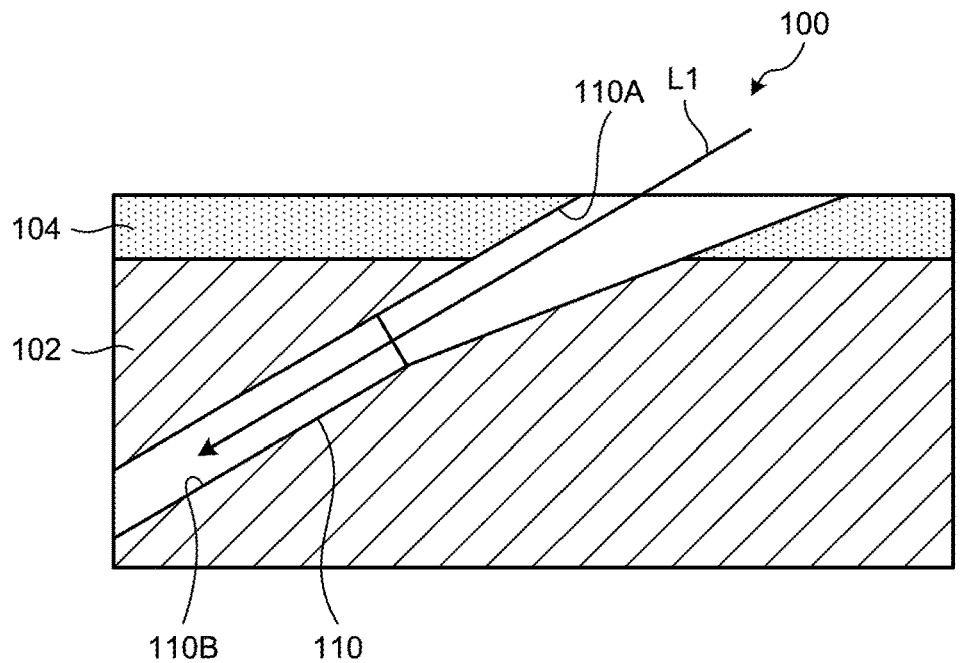
FIG. 17 is an explanatory diagram for describing the operation of the laser machining device.

Next, an example of the operation of the laser machining device 10 is described with reference to FIG. 13 to FIG. 17. FIG. 13 is a schematic diagram illustrating an example of the structure of the object to be machined. FIG. 14 is a flowchart for describing the operation of the laser machining device. FIG. 15 to FIG. 17 are explanatory diagrams for describing the operation of the laser machining device.

First, the structure of the object to be machined 100 is described with reference to FIG. 13. In the object to be machined 100, a protective layer 104 is laminated on the surface of a metal layer 102. The protective layer 104 is a layer configured to protect the metal layer 102 from at least one of heat, stress, and contact of foreign substances. It is preferred that the protective layer 104 be formed from heat-resistant material or abrasion-resistant material. More specifically, it is preferred that the protective layer 104 use alumina ($Al_2O_3$), zirconia ($ZrO_2$), titanium oxide ($TiO_2$), NiCrAlY (NiCrAl), CoCrAlY (CoCrAl), alumina-titania ($Al_2O_3$—$TiO_2$), chromia ($Cr_2O_3$), chromium carbide ($Cr_3C_2$—NiCr), or tungsten carbide ($Cr_3C_2$—NiCr, $Cr_3C_2$—CoCr, $Cr_3C_2$—Co) as heat-resistant material or abrasion-resistant material. The use of the above-mentioned material can increase at least one of heat resistance performance and abrasion resistance performance. Although not specifically illustrated, a bonding layer for bonding the metal layer 102 and the protective layer 104 is formed between the metal layer 102 and the protective layer 104. Note that the bonding layer is not necessary when the protective layer 104 can be directly famed on the metal layer 102.

A turbine blade is exemplified as an object to be machined 100. In a turbine blade, a protective layer 104 serving as TBC (thermal barrier coat) is formed on the surface of a metal layer 102 famed of heat-resistant steel by spraying. The protective layer 104 is a membrane contributing to the improvement of heat resistance performance of the turbine blade. The turbine blade has been described as an example of the object to be machined 100, but the object to be machined is not limited thereto. The object to be machined 100 may be various kinds of members in which a protective layer 104 is laminated on a metal layer 102. For example, a part where a sprayed membrane as the protective layer 104 is famed on the surface of heat-resistant steel as the metal layer 102 similarly to the turbine blade may be an engine combustor.

A part illustrated by the broken lines in FIG. 13 is a through hole 110 to be machined in the object to be machined 100 by the laser machining device 10. The through hole 110 includes a large-diameter portion 110A mainly machined in the protective layer 104 on the surface of the object to be machined 100 and a small-diameter portion 110B mainly machined in the metal layer 102 on the deep side of the object to be machined 100 and having a diameter smaller than that of the large-diameter portion 110A. The large-diameter portion 110A of the through hole 110 is also referred to as "shaped portion", and is a rectangular hole as seen from the surface side of the object to be machined 100. The small-diameter portion 110B of the through hole 110 is a circular hole. In the through hole 110, the hole diameter and the hole shape are gradually changed from the large-diameter portion 110A to the small-diameter portion 110B. When the object to be machined 100 is a turbine blade, the through hole 110 is formed as a cooling hole for film cooling in the metal layer 102 and the protective layer 104 of the turbine blade.

Next, an example of the operation of the laser machining device 10 is described with reference to FIG. 14 to FIG. 17. The laser machining device 10 determines machining conditions (Step S12 in FIG. 14). Specifically, the laser machining device 10 determines the machining time, the type of laser used (fiber laser L1 or short-pulsed laser L2), the power of laser, and the irradiation angle of laser based on the thicknesses and materials of the metal layer 102 and the protective layer 104 in the object to be machined 100.

After determining the machining conditions, the laser machining device 10 performs machining by the short-pulsed laser L2 (Step S14 in FIG. 14). Specifically, the laser machining device 10 irradiates the object to be machined 100 with the short-pulsed laser L2 to cut the object to be machined 100 in the state in which the short-pulsed laser L2 applied from the short-pulsed laser light source 64 enters the laser scanning unit 74 through the switch mechanism 72 (82) and the state in which the short-pulsed laser L2 that has passed through the laser scanning unit 74 enters the condensing optical system 78 on the center axis thereof through the irradiation angle change mechanism 76 (86). The laser machining device 10 cuts the protective layer 104 in the object to be machined 100 by the short-pulsed laser L2. In this manner, as illustrated in FIG. 15 and FIG. 16, the large-diameter portion 110A is formed mainly in the protective layer 104 in the object to be machined 100.

After the machining by the short-pulsed laser L2 is finished, the laser machining device 10 performs machining by the fiber laser L1 (Step S16 in FIG. 14). Specifically, the laser machining device 10 irradiates the object to be machined 100 with the fiber laser L1 to cut the object to be machined 100 in the state in which the fiber laser L1 applied from the fiber laser light source 62 enters the laser scanning unit 74 through the switch mechanism 72 (82) and the state in which the fiber laser L1 that has passed through the laser scanning unit 74 enters the condensing optical system 78 while being shifted (translated) from the center axis thereof through the irradiation angle change mechanism 76 (86). The laser machining device 10 cuts the metal layer 102 in the object to be machined 100 by the fiber laser L1. In this manner, as illustrated in FIG. 17, the small-diameter portion 110B is formed mainly in the metal layer 102 in the object to be machined 100, and the through hole 110 that connects the large-diameter portion 110A in the protective layer 104 and the small-diameter portion 110B in the metal layer 102 is formed. After the machining by the fiber laser L1 is performed, the laser machining device 10 finishes this process.

Note that, in the above-mentioned operation, the laser machining device 10 machines the entire large-diameter portion 110A by the short-pulsed laser L2, but the embodiment is not limited thereto. For example, the laser machining device 10 may machine a part of the large-diameter portion 110A corresponding to the protective layer 104 by the short-pulsed laser L2 and machine the other part by the fiber laser L1 to form the through hole 110. In this case, it is preferred that the machining by the short-pulsed laser L2 be performed at a depth of 0.001 mm or more from the surface of the metal layer 102 (surface on which protective layer 104 is provided) and 50% or less of the thickness of the metal layer 102. Specifically, it is preferred to machine and cut the metal layer 102 by the short-pulsed laser L2 by 0.001 mm or more in the direction orthogonal to the surface of the metal layer 102 and 50% or less of the thickness of the metal layer 102. By setting the above-mentioned depth, the influence of heat on the protective layer 104 caused when the metal layer 102 is thereafter irradiated with the fiber laser L1 and machined can be reduced.

The laser machining device 10 cuts the protective layer 104 by the short-pulsed laser L2 in this manner, and hence the influence of heat caused in the protective layer 104 can be further reduced. Furthermore, the laser machining device 10 cuts the metal layer 102 by the fiber laser L1, and hence the time required for cutting the metal layer 102 can be shortened. Accordingly, the laser machining device 10 can reduce the heat influence of the protective layer 104 while preventing the machining time of the object to be machined 100 from being long, and the object to be machined 100 can be machined with high precision at high speed.

For example, for a structure formed by a method of spraying a metal layer (heat-resistant steel) 102 with a protective layer (TBC) 104 as represented by the above-mentioned turbine blade in a gas turbine, it is difficult to perform cutting with high quality due to the composite material as compared with the case where there is only heat-resistant steel. Specifically, the metal layer 102 and the protective layer 104 have different appropriate machining conditions, and hence if appropriate conditions are set for machining of one of the layers, the quality of the other layer decreases. TBC and heat-resistant steel have different coefficients of thermal expansion for input heat, and the heat influence such as cracks easily occurs in the TBC. The surface of the TBC has a higher surface roughness than the heat-resistant steel, and dross is more liable to adhere and is less easily removed, that is, the heat influence is more liable to be high. On the other hand, the laser machining device 10 can cut the protective layer 104 by the short-pulsed laser L2 to perform cutting with high quality while reducing the heat influence.

The laser machining device 10 machines the metal layer 102 by the fiber laser L1, and hence the metal layer 102 can be machined in a short period of time.

As described above, in the laser machining device 10 in the present embodiment, the fiber laser light source 62 and the short-pulsed laser light source 64 are provided, and the laser to be applied can be switched by the switch mechanism 72 (82), and hence the laser to be used can be switched depending on the size, thickness, and material of the object to be machined 100. Consequently, machining by the fiber laser L1 and machining by the short-pulsed laser L2 can be performed by a single laser machining head 60. Thus, machining can be performed while maintaining the fixed state of the object to be machined 100, and the off-centering can be prevented from occurring at a machined part. As a result, machining appropriate for the intended use can be performed with high quality and high precision in a short period of time.

In the laser machining device 10 in the present embodiment, the irradiation angle change mechanism 76 (86) is used to change the incident position of applied laser to the condensing optical system 78 such that the laser enters the condensing optical system 78 while being shifted (translated) from the center axis thereof and the object to be machined 100 is irradiated with laser light such that the irradiation angle of the laser light is inclined with respect to the center axis and the condensing position is the same. Thus, the irradiation angle of laser to be used can be changed depending on the large-diameter portion 110A and the small-diameter portion 110B having different hole diameters and different hole shapes in the through hole 110 to be machined. Consequently, machining appropriate for the hole diameter and the hole shape can be performed with high quality and high precision in a short period of time.

The laser machining device 10 in the present embodiment includes, as the switch mechanism 72, the mirror 72A configured to reflect the laser and the slide movement mechanism unit 72B configured to slidingly move the mirror 72A, and the state in which one of the fiber laser L1 and the short-pulsed laser L2 is reflected by the mirror 72A to enter the condensing optical system 78 and the state in which the other of the fiber laser L1 and the short-pulsed laser L2 enters the condensing optical system 78 not through the mirror 72A are switched by the sliding movement of the mirror 72A by the slide movement mechanism unit 72B. Thus, the lasers L1 and L2 can be switched.

The laser machining device 10 in the present embodiment includes, as the switch mechanism 82, the mirror 82Aa configured to reflect the laser and the rotational movement mechanism unit 82B configured to rotationally move the mirror 82Aa, and the state in which one of the fiber laser L1 and the short-pulsed laser L2 is reflected by the mirror 82Aa to enter the condensing optical system 78 and the state in which the other of the fiber laser L1 and the short-pulsed laser L2 enters the condensing optical system 78 not through the mirror 82Aa are switched by the rotational movement of the mirror 82Aa by the rotational movement mechanism unit 82B. Thus, the lasers L1 and L2 can be switched. In particular, the switch mechanism 82 is configured such that the rotational movement mechanism unit 82B rotationally moves the mirror 82Aa, and hence the lasers L1 and L2 can be switched at higher speed to perform machining in a shorter period of time as compared with the sliding movement. In addition, the switch mechanism 82 is configured such that the rotational movement mechanism unit 82B rotationally moves the mirror 82Aa, and hence the posture of the mirror 82Aa can be stably supported by the rotation shaft 82Ba as compared with the sliding movement, and high-quality and high-precision machining can be performed.

The laser machining device 10 in the present embodiment includes, as the irradiation angle change mechanism 76, the mirror 76A configured to reflect the laser and the slide movement mechanism unit 76B configured to slidingly move the mirror 76A along the axial direction of the laser, and the incident positions of the fiber laser L1 and the short-pulsed laser L2 with respect to the condensing optical system 78 can be changed by the sliding movement of the mirror 76A by the slide movement mechanism unit 76B. By using the irradiation angle change mechanism 76 to change the incident positions of the fiber laser L1 and the short-pulsed laser L2 with respect to the condensing optical system 78, the irradiation angles of the lasers L1 and L2 can be changed to perform machining for different diameters and shapes with high precision in a short period of time.

The laser machining device 10 in the present embodiment includes, as the irradiation angle change mechanism 86, the mirror 86Aa configured to reflect the laser, the rotational movement mechanism unit 86B configured to rotationally move the mirror 86Aa, and the fixed mirror 86C that is fixed at a position different from the mirror 86Aa in an axial direction of the laser and configured to reflect the laser, and the state in which one of the fiber laser L1 and the short-pulsed laser L2 is reflected by the mirror 86Aa to enter the condensing optical system 78 and the state in which the other of the fiber laser L1 and the short-pulsed laser L2 is reflected by the fixed mirror 86C to enter the condensing optical system 78 not through the mirror 86Aa are changed by the rotational movement of the mirror 86Aa by the rotational movement mechanism unit 86B. Thus, the incident positions of the fiber laser L1 and the short-pulsed laser L2 with respect to the condensing optical system 78 can be changed. By using the irradiation angle change mechanism 86 to change the incident positions of the fiber laser L1 and the short-pulsed laser L2 with respect to the condensing optical system 78, the irradiation angles of the lasers L1 and L2 can be changed to perform machining for different diameters and shapes with high precision in a short period of time. In particular, the irradiation angle change mechanism 86 is configured such that the rotational movement mechanism unit 86B rotationally moves the mirror 86Aa, and hence the incident positions of the lasers L1 and L2 can be changed at higher speed to perform machining at high speed as compared with the sliding movement. In addition, the irradiation angle change mechanism 86 is configured such that the rotational movement mechanism unit 86B rotationally moves the mirror 86Aa, and hence the posture of the mirror 86Aa can be stably supported by the rotation shaft 86Ba as compared with the sliding movement, and high-quality and high-precision machining can be performed.

In the laser machining device 10 in the present embodiment, the laser machining head 60 is configured such that a distance for the short-pulsed laser L2 to enter the condensing optical system 78 from the switch mechanism 72 (82) is shorter than a distance for the fiber laser L1 to enter the condensing optical system 78 from the switch mechanism 72 (82). Specifically, in the switch mechanism 72 (82), the fiber laser L1 is reflected by the mirror 72A (82Aa) to enter the condensing optical system 78, and the short-pulsed laser L2 enters the condensing optical system 78 not through the mirror 72A (82Aa). This configuration can reduce energy loss of the short-pulsed laser L2 for performing machining for which precision is required, and thus can perform machining with high precision.

Note that the laser machining device 10 in the present embodiment is not necessarily required to have the irradiation angle change mechanism 76 (86) in the configuration in which the lasers L1 and L2 are switched by the switch mechanism 82, and because the rotational movement mechanism unit 82B rotationally moves the mirror 82Aa, the lasers L1 and L2 can be switched at higher speed to perform machining in a shorter period of time as compared with the sliding movement. In addition, the switch mechanism 82 is configured such that the rotational movement mechanism unit 82B rotationally moves the mirror 82Aa, and hence the posture of the mirror 82Aa can be stably supported by the rotation shaft 82Ba as compared with the sliding movement, and the effect that high-precision machining is performed can be obtained.

The laser machining device 10 in the present embodiment is not necessarily required to have the switch mechanism 72 (82) in the configuration in which the incident position of the laser L1 or L2 with respect to the condensing optical system 78 is changed by the irradiation angle change mechanism 76. By using the irradiation angle change mechanism 76 to change the incident positions of the fiber laser L1 and the short-pulsed laser L2 with respect to the condensing optical system 78, the irradiation angles of the lasers L1 and L2 can be changed to perform machining for different diameters and shapes with high precision in a short period of time.

The laser machining device 10 in the present embodiment is not necessarily required to have the switch mechanism 72 (82) in the configuration in which the incident positions of the lasers L1 and L2 with respect to the condensing optical system 78 are changed by the irradiation angle change mechanism 86. By using the irradiation angle change mechanism 86 to change the incident positions of the fiber laser L1 and the short-pulsed laser L2 with respect to the condensing optical system 78, the irradiation angles of the lasers L1 and L2 can be changed to perform machining for different diameters and shapes with high precision in a short period of time.

In the laser machining device 10 in the present embodiment, in the configuration in which the incident positions of the lasers L1 and L2 with respect to the condensing optical system 78 are changed by the irradiation angle change mechanism 76 (86), the laser light source includes the fiber laser light source 62 configured to output fiber laser L1 and the short-pulsed laser light source 64 configured to output short-pulsed laser L2 having a pulse width different from a pulse width of the fiber laser L1, and the incident positions of the fiber laser L1 and the short-pulsed laser L2 with respect to the condensing optical system 78 are changed. Consequently, the effect that machining for different diameters and shapes can be performed with high precision in a short period of time can be remarkably obtained.

Figure 18:
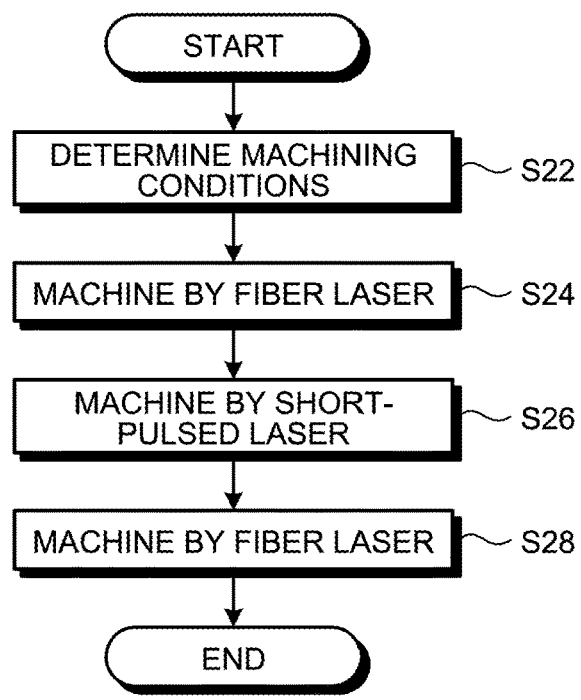
FIG. 18 is a flowchart for describing another example of the operation of the laser machining device.
Figure 19:
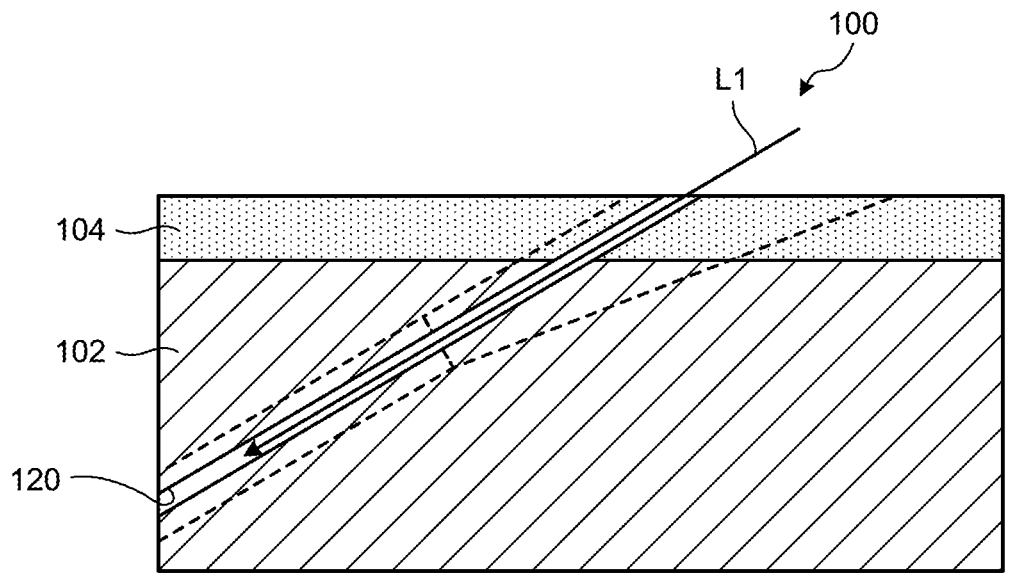
FIG. 19 is an explanatory diagram for describing another example of the operation of the laser machining device.
Figure 20:
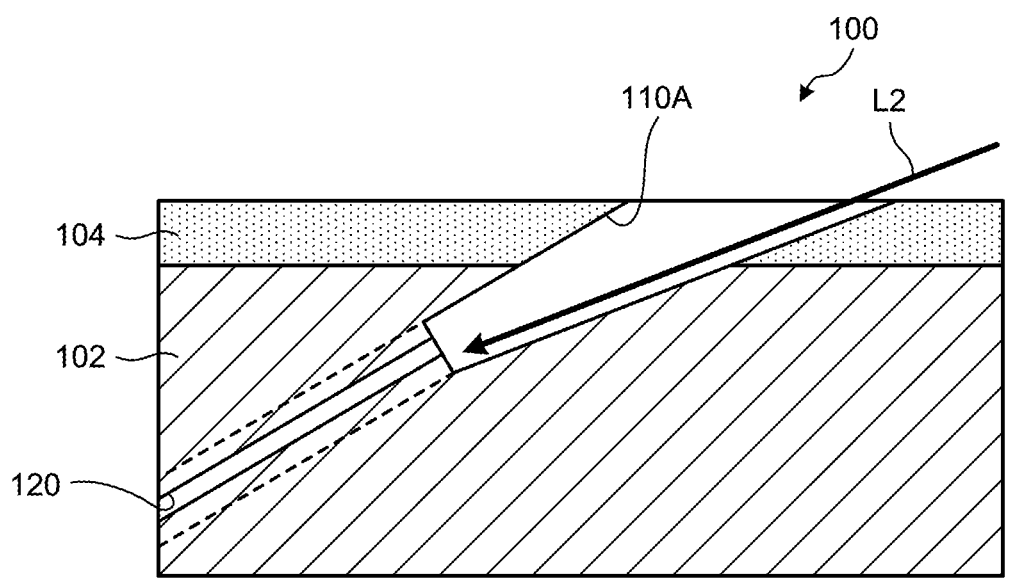
FIG. 20 is an explanatory diagram for describing another example of the operation of the laser machining device.
Figure 21:
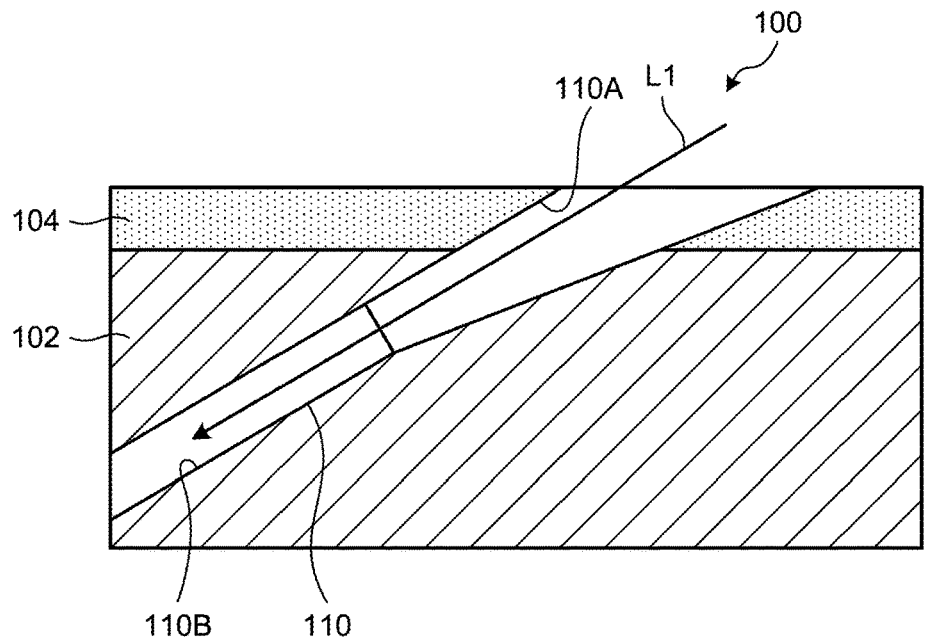
FIG. 21 is an explanatory diagram for describing another example of the operation of the laser machining device.

Next, a laser machining method in another example of the operation of the laser machining device 10 is described with reference to FIG. 18 to FIG. 21. FIG. 18 is a flowchart for describing the other example of the operation of the laser machining device. FIG. 19 to FIG. 21 are explanatory diagrams for describing the other example of the operation of the laser machining device.

The same as described above applies true for the object to be machined 100 and the through hole 110 to be machined (see FIG. 13).

The laser machining device 10 determines machining conditions (Step S22 in FIG. 18). Specifically, the laser machining device 10 determines the machining time, the type of laser used (fiber laser L1 or short-pulsed laser L2), the power of laser, and the irradiation angle of laser based on the thicknesses and materials of the metal layer 102 and the protective layer 104 in the object to be machined 100.

After determining the machining conditions, the laser machining device 10 performs machining by the fiber laser L1 (Step S24 in FIG. 18). Specifically, the laser machining device 10 irradiates the object to be machined 100 with the fiber laser L1 to cut the object to be machined 100 in the state in which the fiber laser L1 applied from the fiber laser light source 62 enters the laser scanning unit 74 through the switch mechanism 72 (82) and the state in which the fiber laser L1 that has passed through the laser scanning unit 74 enters the condensing optical system 78 while being shifted (translated) from the center axis thereof through the irradiation angle change mechanism 76 (86). The laser machining device 10 cuts the protective layer 104 and the metal layer 102 in the object to be machined 100 by the fiber laser L1. In this machining, as illustrated in FIG. 19, an auxiliary through hole 120 having a diameter smaller than the diameters of the large-diameter portion 110A and the small-diameter portion 110B is formed.

After the machining of the auxiliary through hole 120 by the fiber laser L1 is finished, the laser machining device 10 performs machining by the short-pulsed laser L2 (Step S26 in FIG. 18). Specifically, the laser machining device 10 irradiates the object to be machined 100 with the short-pulsed laser L2 to cut the object to be machined 100 in the state in which the short-pulsed laser L2 applied from the short-pulsed laser light source 64 enters the laser scanning unit 74 through the switch mechanism 72 (82) and the state in which the short-pulsed laser L2 that has passed through the laser scanning unit 74 enters the condensing optical system 78 on the center axis thereof through the irradiation angle change mechanism 76 (86). The laser machining device 10 cuts the protective layer 104 in the object to be machined 100 by the short-pulsed laser L2. In this manner, a large-diameter portion 110A is formed mainly in the protective layer 104 in the object to be machined 100 as illustrated in FIG. 20.

After the machining of the large-diameter portion 110A by the short-pulsed laser L2 is finished, the laser machining device 10 performs machining by the fiber laser L1 (Step S28 in FIG. 18). Specifically, the laser machining device 10 irradiates the object to be machined 100 with the fiber laser L1 to cut the object to be machined 100 in the state in which the fiber laser L1 applied from the fiber laser light source 62 enters the laser scanning unit 74 through the switch mechanism 72 (82) and the state in which the fiber laser L1 that has passed through the laser scanning unit 74 enters the condensing optical system 78 while being shifted (translated) from the center axis thereof through the irradiation angle change mechanism 76 (86). The laser machining device 10 cuts the metal layer 102 in the object to be machined 100 by the fiber laser L1. In this manner, a small-diameter portion 110B is formed mainly in the metal layer 102 in the object to be machined 100 as illustrated in FIG. 21, and a through hole 110 that connects the large-diameter portion 110A in the protective layer 104 and the small-diameter portion 110B in the metal layer 102 is formed. After the machining by the fiber laser L1 is performed, the laser machining device 10 finishes this process.

In this laser machining method, the through hole 110 is famed in the object to be machined 100 in a manner that the auxiliary through hole 120 having a diameter smaller than that of the through hole 110 is famed and then the auxiliary through hole 120 is enlarged. The diameter of the auxiliary through hole 120 is smaller than the hole diameter of the small-diameter portion 110B having the smallest diameter in the through hole 110. Thus, because the auxiliary through hole 120 is famed first, when the large-diameter portion 110A and the small-diameter portion 110B are subsequently machined, dross as a molten material of the object to be machined 100 is discharged to the deeper side (downstream side in laser incident direction) through the auxiliary through hole 120. Consequently, a situation where dross outflows to the surface of the object to be machined 100 and is scattered can be prevented, and the dross can be prevented from adhering and solidifying on the surface of the object to be machined 100 as spatter to perform high-quality cutting. In addition, the work for removing the spatter is unnecessary because the adhesion of spatter is prevented, and hence the machining time and the work cost can be reduced.

Note that, in the above-mentioned, the laser machining method in which the auxiliary through hole 120 is first machined in the case where the through hole 110 formed of the large-diameter portion 110A and the small-diameter portion 110B is machined has been described, but the embodiment is not limited thereto. For example, although not specifically illustrated, when a through hole having a uniform inner diameter is to be machined, similar effects can be obtained by first machining an auxiliary through hole having a diameter smaller than that of the through hole.

Figure 22:
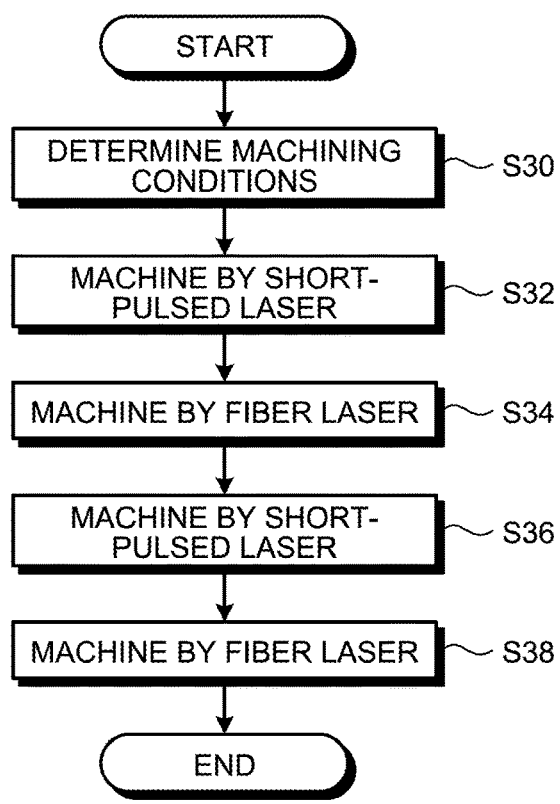
FIG. 22 is a flowchart for describing another example of the operation of the laser machining device.

Next, a laser machining method in another example of the operation of the laser machining device 10 is described with reference to FIG. 22 to FIG. 26. FIG. 22 is a flowchart for describing the other example of the operation of the laser machining device. FIG. 23 to FIG. 26 are explanatory diagrams for describing the other example of the operation of the laser machining device.

The same as described above applies true for the object to be machined 100 and the through hole 110 to be machined (see FIG. 13).

The laser machining device 10 determines machining conditions (Step S30 in FIG. 22). Specifically, the laser machining device 10 determines the machining time, the type of laser used (fiber laser L1 or short-pulsed laser L2), the power of laser, and the irradiation angle of laser based on the thicknesses and materials of the metal layer 102 and the protective layer 104 in the object to be machined 100.

Figure 23:
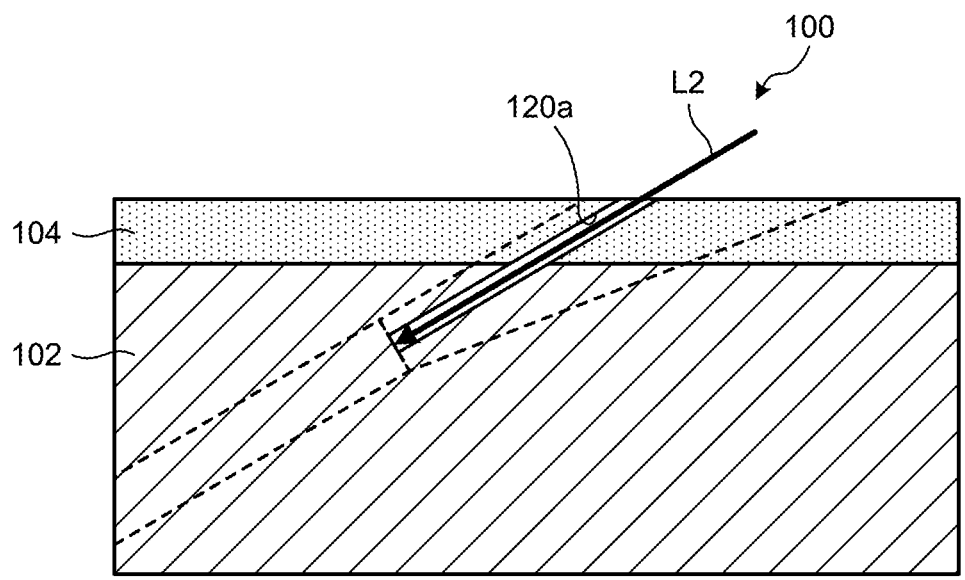
FIG. 23 is an explanatory diagram for describing another example of the operation of the laser machining device.

After determining the machining conditions, the laser machining device 10 performs machining by the short-pulsed laser L2 (Step S32 in FIG. 22). Specifically, the laser machining device 10 irradiates the object to be machined 100 with the short-pulsed laser L2 to cut the object to be machined 100 in the state in which the short-pulsed laser L2 applied from the short-pulsed laser light source 64 enters the laser scanning unit 74 through the switch mechanism 72 (82) and the state in which the short-pulsed laser L2 that has passed through the laser scanning unit 74 enters the condensing optical system 78 on the center axis thereof through the irradiation angle change mechanism 76 (86). The laser machining device 10 cuts the protective layer 104 in the object to be machined 100 by the short-pulsed laser L2. In this machining, as illustrated in FIG. 23, an auxiliary hole 120a having a diameter smaller than the diameters of the large-diameter portion 110A and the small-diameter portion 110B is famed mainly in the protective layer 104 in the object to be machined 100.

Figure 24:
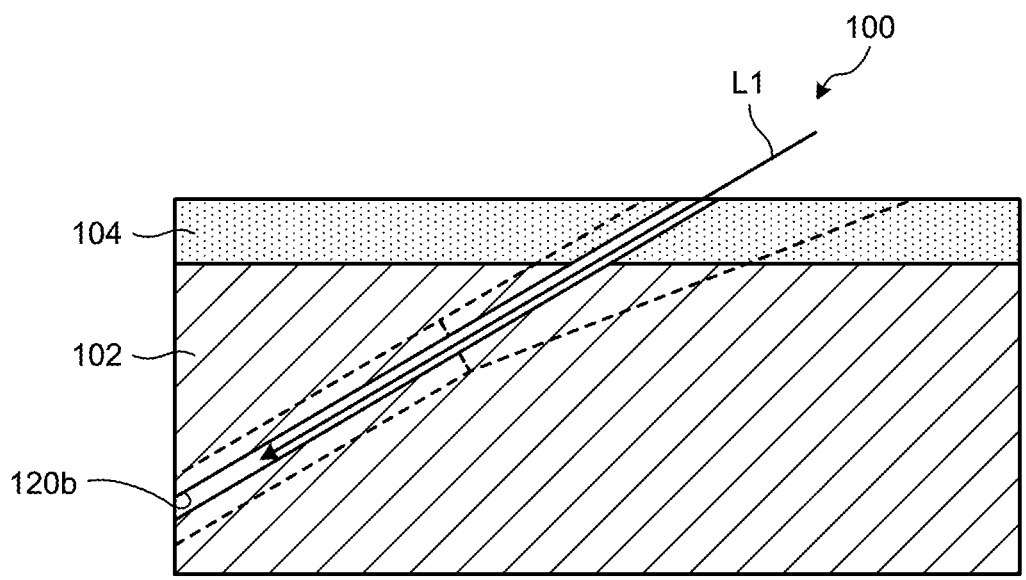
FIG. 24 is an explanatory diagram for describing another example of the operation of the laser machining device.

After the machining of the auxiliary hole 120a by the short-pulsed laser L2 is finished, the laser machining device 10 performs machining by the fiber laser L1 (Step S34 in FIG. 22). Specifically, the laser machining device 10 irradiates the object to be machined 100 with the fiber laser L1 to cut the object to be machined 100 in the state in which the fiber laser L1 applied from the fiber laser light source 62 enters the laser scanning unit 74 through the switch mechanism 72 (82) and the state in which the fiber laser L1 that has passed through the laser scanning unit 74 enters the condensing optical system 78 while being shifted (translated) from the center axis thereof through the irradiation angle change mechanism 76 (86). The laser machining device 10 cuts the protective layer 104 and the metal layer 102 in the object to be machined 100 by the fiber laser L1. In this machining, as illustrated in FIG. 24, an auxiliary through hole 120b having substantially the same diameter as that of the auxiliary hole 120a is formed subsequently to the auxiliary hole 120a.

Figure 25:
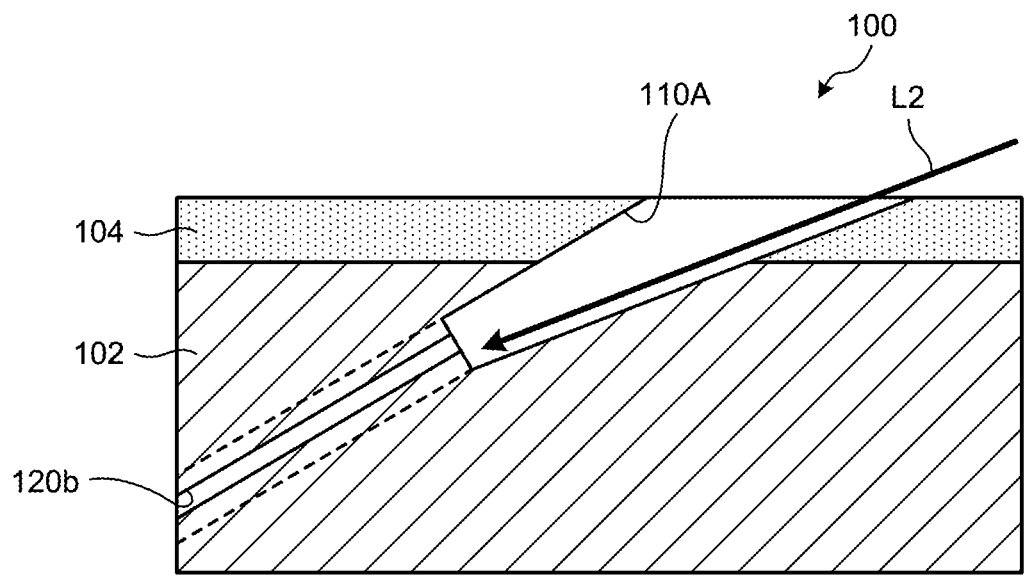
FIG. 25 is an explanatory diagram for describing another example of the operation of the laser machining device.

After the machining of the auxiliary through hole 120b by the fiber laser L1 is finished, the laser machining device 10 performs machining by the short-pulsed laser L2 (Step S36 in FIG. 22). Specifically, the laser machining device 10 irradiates the object to be machined 100 with the short-pulsed laser L2 to cut the object to be machined 100 in the state in which the short-pulsed laser L2 applied from the short-pulsed laser light source 64 enters the laser scanning unit 74 through the switch mechanism 72 (82) and the state in which the short-pulsed laser L2 that has passed through the laser scanning unit 74 enters the condensing optical system 78 on the center axis thereof through the irradiation angle change mechanism 76 (86). The laser machining device 10 cuts the protective layer 104 in the object to be machined 100 by the short-pulsed laser L2. In this manner, a large-diameter portion 110A is formed mainly in the protective layer 104 in the object to be machined 100 as illustrated in FIG. 25.

Figure 26:
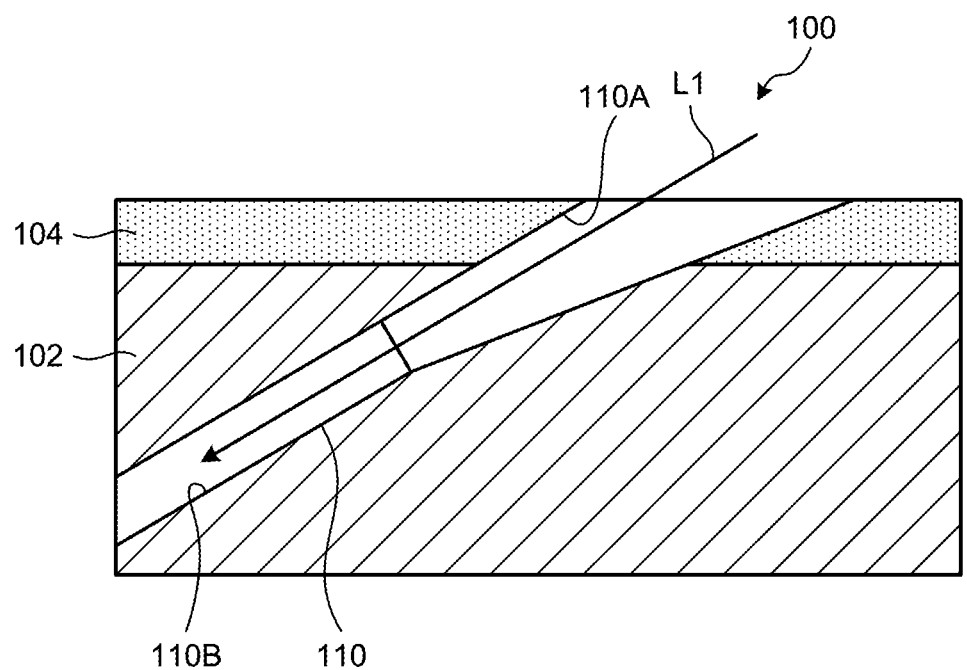
FIG. 26 is an explanatory diagram for describing another example of the operation of the laser machining device.

After the machining of the large-diameter portion 110A by the short-pulsed laser L2 is finished, the laser machining device 10 performs machining by the fiber laser L1 (Step S38 in FIG. 22). Specifically, the laser machining device 10 irradiates the object to be machined 100 with the fiber laser L1 to cut the object to be machined 100 in the state in which the fiber laser L1 applied from the fiber laser light source 62 enters the laser scanning unit 74 through the switch mechanism 72 (82) and the state in which the fiber laser L1 that has passed through the laser scanning unit 74 enters the condensing optical system 78 while being shifted (translated) from the center axis thereof through the irradiation angle change mechanism 76 (86). The laser machining device 10 cuts the metal layer 102 in the object to be machined 100 by the fiber laser L1. In this manner, a small-diameter portion 110B is formed mainly in the metal layer 102 in the object to be machined 100 as illustrated in FIG. 26, and a through hole 110 that connects the large-diameter portion 110A in the protective layer 104 and the small-diameter portion 110B in the metal layer 102 is formed. After the machining by the fiber laser L1 is performed, the laser machining device 10 finishes this process.

In this laser machining method, the through hole 110 is famed in the object to be machined 100 in a manner that the auxiliary hole 120a having a diameter smaller than that of the through hole 110 is famed mainly in the protective layer 104, the auxiliary through hole 120b connected to the auxiliary hole 120a is thereafter formed mainly in the metal layer 102, and the auxiliary hole 120a and the auxiliary through hole 120b are enlarged. The diameters of the auxiliary hole 120a and the auxiliary through hole 120b are smaller than the hole diameter of the small-diameter portion 110B having the smallest diameter in the through hole 110. Thus, because the auxiliary hole 120a and the auxiliary through hole 120b are famed first, when the large-diameter portion 110A and the small-diameter portion 110B are subsequently machined, dross as a molten material of the object to be machined 100 is discharged to the deeper side (downstream side in laser incident direction) through the auxiliary through hole 120b. Consequently, a situation where dross outflows to the surface of the object to be machined 100 and is scattered can be prevented, and the dross can be prevented from adhering and solidifying on the surface of the object to be machined 100 as spatter to perform high-quality cutting. In addition, the work for removing the spatter is unnecessary because the adhesion of spatter is prevented, and hence the machining time and the work cost can be reduced.

In particular, the short-pulsed laser L2 with a pulse width of 100 microseconds or less has high peak power of several tens of kW or more and can perform high-quality machining capable of suppressing the generation of dross, and hence the use of the short-pulsed laser L2 to form the auxiliary hole 120a in the protective layer 104 is effective to minimize the amount of spatter adhesion on the protective layer 104. It was found from observation of the generation of spatter that spatter is apt to be particularly generated early in laser machining. Thus, in forming the auxiliary through hole 120b, an object to be machined is irradiated with the short-pulsed laser L2 having a pulse width of 100 microseconds or less to form the auxiliary hole 120a at an early stage where spatter is apt to be generated, and is thereafter irradiated with the fiber laser L1. In this manner, the machining time can be reduced while the amount of spatter adhesion is minimized.

Note that, in the above-mentioned embodiment, the laser machining method in which the auxiliary hole 120a and the auxiliary through hole 120b are first machined in the case where the through hole 110 famed of the large-diameter portion 110A and the small-diameter portion 110B is machined has been described, but the embodiment is not limited thereto. For example, although not specifically illustrated, when a through hole having a uniform inner diameter is to be machined, similar effects can be obtained by first machining an auxiliary hole and an auxiliary through hole having diameters smaller than the diameter of the through hole.

REFERENCE SIGNS LIST

10 Laser machining device
14 Movement unit
16 Stage unit
22 Laser machining unit
24 Control unit
30 Y-axis movement mechanism
34 X-axis movement mechanism
38 Z-axis movement mechanism
60 Laser machining head
62 Fiber laser light source (first laser light source)
64 Short-pulsed laser light source (second laser light source)
72 Switch mechanism
72A Mirror
72B Slide movement mechanism unit
76 Irradiation angle change mechanism
76A Mirror
76B Slide movement mechanism unit
78 Condensing optical system
82 Switch mechanism
82Aa Mirror
82B Rotational movement mechanism unit
86 Irradiation angle change mechanism
86Aa Mirror (first mirror)
86B Rotational movement mechanism unit
86C Fixed mirror (second mirror)
100 Object to be machined
102 Metal layer
104 Protective layer
110 Through hole
110A Large-diameter portion
110B Small-diameter portion
120 Auxiliary through hole
L1 Fiber laser (first laser)
L2 Short-pulsed laser (second laser)

The invention claimed is:

1. A laser machining device, comprising:
a stage unit including a stage configured to support an object to be machined;
a laser machining head configured to apply laser for machining the object to be machined, the laser machining head coupled to a first laser light source configured to output first laser beam, a second laser light source configured to output second laser beam having a pulse width different from a pulse width of the first laser beam, a condensing optical system provided between the object to be machined and the first and second laser light sources to condense at least the first and second laser beams on the object to be machined, a switch mechanism provided between the condensing optical system and the first and second laser light sources so that the switch mechanism is movable to a position that at least one of the first laser beam and the second laser beam enters the condensing optical system, and an irradiation angle change mechanism provided between the condensing optical system and the switch mechanism to change an irradiation angle of the first laser beam with respect to an optical axis of the condensing optical system; and a controller configured to control the laser machining head, wherein the controller controls the laser machining head according to a machining condition for the object to be machined to machine a through hole.

2. The laser machining device according to claim 1, wherein the switch mechanism includes a mirror configured to reflect the laser beam, and a slide movement mechanism unit configured to slide and move the mirror, and the sliding movement of the mirror by the slide movement mechanism unit makes switching between a state in which one of the first laser beam and the second laser beam is reflected by the mirror to enter the condensing optical system and a state in which the other of the first laser beam and the second laser beam enters the condensing optical system without going through the mirror.

3. The laser machining device according to claim 1, wherein the switch mechanism includes a mirror configured to reflect the laser beam, and a rotational movement mechanism unit configured to rotationally move the mirror, and the rotational movement of the mirror by the rotational movement mechanism unit makes switching between a state in which one of the first laser beam and the second laser beam is reflected by the mirror to enter the condensing optical system and a state in which the other of the first laser beam and the second laser beam enters the condensing optical system without going through the mirror.

4. The laser machining device according to claim 1, wherein the irradiation angle change mechanism includes a mirror configured to reflect the laser beam, and a slide movement mechanism unit configured to slidingly move the mirror along an axial direction of the laser beam, and the sliding movement of the mirror by the slide movement mechanism unit changes incident positions of the first laser beam and the second laser beam with respect to the condensing optical system.

5. The laser machining device according to claim 1, wherein the irradiation angle change mechanism includes a first mirror configured to reflect the laser beam, a rotational movement mechanism unit configured to rotationally move the first mirror, and a second mirror that is fixed at a different position from the first mirror in an axial direction of the laser beam to reflect the laser beam, and the rotational movement of the first mirror by the rotational movement mechanism unit makes switching between a state in which one of the first laser beam and the second laser beam is reflected by the first mirror to enter the condensing optical system and a state in which the other of the first laser beam and the second laser beam is reflected by the second mirror to enter the condensing optical system without going through the first mirror.

6. The laser machining device according to claim 1, wherein the first laser light source outputs laser beam having a pulse width of more than 100 microseconds as the first laser beam, and the second laser light source outputs short-pulsed laser beam having a pulse width of 100 microseconds or less as the second laser beam.

7. The laser machining device according to claim 6, wherein the laser machining head is configured such that a distance for the short-pulsed laser beam to enter the condensing optical system is shorter than a distance for the laser beam having a pulse width of more than 100 microseconds to enter the condensing optical system.

8. The laser machining device according to claim 1, wherein the controller controls the first laser light source or the second laser light source as well as the laser machining head to cut an auxiliary through hole having a diameter smaller than a diameter of the through hole in a machining range of the through hole in the object to be machined, and after cutting the auxiliary through hole, the controller controls the first laser light source or the second laser light source as well as the laser machining head to cut the through hole such that the auxiliary through hole is enlarged.

9. A laser machining method for machining, by laser beam, a through hole in which a large-diameter portion that is opened to have a large diameter on a surface side and a small-diameter portion having a small diameter on a deep side communicate to each other in an object to be machined having a laminate structure in which a protective layer is formed on a surface of a metal layer, the laser machining method comprising:

cutting an auxiliary through hole having a diameter smaller than a diameter of the small-diameter portion in a machining range of the through hole in the object to be machined; and cutting the through hole in a manner to enlarge the auxiliary through hole, wherein cutting the auxiliary through hole includes applying short-pulsed laser beam having a pulse width of 100 microseconds or less and thereafter applying laser beam having a pulse width of more than 100 microseconds for machining, and thereafter cutting the through hole includes applying short-pulsed laser beam having a pulse width of 100 microseconds or less to machine the large-diameter portion and thereafter applying laser beam having a pulse width of more than 100 microseconds to machine the small-diameter portion.

10. The laser machining method according to claim 9, wherein cutting the auxiliary through hole includes applying laser beam having a pulse width of more than 100 microseconds for machining, and cutting the through hole includes applying short-pulsed laser beam having a pulse width of 100 microseconds or less to machine the large-diameter portion and thereafter applying laser beam having a pulse width of more than 100 microseconds to machine the small-diameter portion.

\* \* \* \* \*